United States Patent
Yamaguchi et al.

(10) Patent No.: US 8,668,234 B2
(45) Date of Patent: Mar. 11, 2014

(54) BUMPER BEAM

(75) Inventors: Takunori Yamaguchi, Kobe (JP);
Masao Kinefuchi, Kobe (JP);
Tomokazu Nakagawa, Kobe (JP); Mie Tachibana, Kakogawa (JP); Kenichi Watanabe, Kakogawa (JP)

(73) Assignee: Kobe Steel, Ltd., Kobe-shi, Hyogo (JP)

( * ) Notice: Subject to any disclaimer, the term of this patent is extended or adjusted under 35 U.S.C. 154(b) by 815 days.

(21) Appl. No.: 12/735,888

(22) PCT Filed: Feb. 25, 2009

(86) PCT No.: PCT/JP2009/053423
§ 371 (c)(1),
(2), (4) Date: Aug. 24, 2010

(87) PCT Pub. No.: WO2009/107670
PCT Pub. Date: Sep. 3, 2009

(65) Prior Publication Data
US 2013/0181463 A1    Jul. 18, 2013

(30) Foreign Application Priority Data

Feb. 27, 2008  (JP) ................ 2008-045913
Mar. 26, 2008  (JP) ................ 2008-081061
Jan. 20, 2009  (JP) ................ 2009-009537

(51) Int. Cl.
*B60R 19/02*        (2006.01)
(52) U.S. Cl.
USPC ....................................... 293/120
(58) Field of Classification Search
USPC ............. 293/120, 121, 122, 130, 102, 133
See application file for complete search history.

(56) References Cited

U.S. PATENT DOCUMENTS 3,779,592  A      12/1973  Golze et al.
6,726,261  B2 *   4/2004   Goto et al. .............. 293/120
6,971,691  B1     12/2005  Heatherington et al.

FOREIGN PATENT DOCUMENTS

| JP | 11-059296 | 3/1999 |
| JP | 11-334500 | 12/1999 |
| JP | 2000-052897 | 2/2000 |

(Continued)

OTHER PUBLICATIONS

European Search Report dated Feb. 9, 2012, for PCT/JP2009/053423.

(Continued)

*Primary Examiner* — Joseph Pape
*Assistant Examiner* — Dana Ivey
(74) *Attorney, Agent, or Firm* — Stites & Harbison PLLC; Juan Carlos A. Marquez, Esq.

(57) ABSTRACT

A bumper beam having increased bending strength achieved with a minimum increase in the weight of the bumper beam. The bumper beam (1) is mounted to the front of a vehicle, extends along a reference line (W), and is provided with a beam body (2) and a reinforcing plate (3). In at least one cross section perpendicular to the reference line (W), the reinforcing plate (3) extends linearly and the beam body (2) includes a pair of protrusions (2t, 2s) protruding, while surrounding an inner space, from the reinforcing plate (3) in a direction intersecting the reinforcing plate (3). If the Young's modulus and the density of the beam body (2) are $E_{st}$ and $\rho_{st}$, respectively, and the Young's modulus and the density of the reinforcing plate (3) are $E_2$ and $\rho_2$, respectively, the expression $(E_{st}/\rho_{st}^3)<(E_2/\rho_2^3)$ is satisfied.

13 Claims, 14 Drawing Sheets

(56) References Cited

FOREIGN PATENT DOCUMENTS

| JP | 2003-129611 | 5/2003 |
|----|-------------|--------|
| JP | 2003-312404 | 11/2003 |
| JP | 2004-148915 | 5/2004 |
| JP | 2005-008146 | 1/2005 |
| JP | 2005-088651 | 4/2005 |
| JP | 2006-218904 | 8/2006 |
| JP | 2006-248336 | 9/2006 |

OTHER PUBLICATIONS

International Search Report for Application PCT/JP2009/053423 mailed May 19, 2009.

* cited by examiner

BUMPER BEAM

FIELD OF THE INVENTION

The present invention relates to a bumper beam to be mounted on an automotive body.

BACKGROUND ART

Many of automotive bumper beams to be mounted on automotive bodies are formed by use of steel plate of 980 MPa·class so that a cross section orthogonal to the longitudinal direction has a B-shape. The "B-shape" referred to in the specification means a shape having a reference wall extending in a specific direction on the cross section and a pair of swelling parts each swelling from the reference wall in a direction orthogonal to the reference part to form a space inside thereof.

The principal roles of such an automotive bumper beam are (i) to absorb, in a collision with a collision object, the impact energy of the collision by itself through its own deformation and (ii) to cause, in the collision, side members on the lateral side of a vehicle body to absorb the energy of collision by transmitting the impact load to the side members to deform the side members. Namely, the bumper beam is configured to suppress the deformation of an automotive cabin as designed to protect the occupant from the impact by causing the side members to absorb the impact energy.

With respect to concrete structures of such a bumper beam, various technologies are conventionally known.

For example, Patent Literature 1 discloses a support for automotive bumper including a B-shaped sectional reinforcement having an upper cylindrical part and a lower cylindrical part, and a foam material filled in each of the cylindrical parts. This support attains reduction in weight thereof and prevention of buckling of the reinforcement by filling the foam material.

Patent Literature 2 discloses a bumper main beam having an upper wall, an upper-side intermediate piece, a lower wall, and a lower-side intermediate piece that constitute the B-shaped cross section, the upper wall and the lower intermediate piece being inclined downwardly, and the lower wall and the upper intermediate piece being inclined upwardly. In this structure, the upper wall and lower wall of the main beam are buckled in a bellows shape in a vehicular crash, whereby the safety to the occupant of the crashing vehicle and the occupant of the crashed vehicle is improved.

Patent Literature 3 discloses a back beam for automotive bumper, including two hollow members, a plurality of brackets mutually connecting the hollow members so that the hollow members constitute a B-shaped cross section, and a reinforcement member locally reinforcing a relatively weak center part that is the connection part between the hollow members.

Patent Literature 4 discloses a reinforcement for automotive bumper, including a web, a compressive flange and a tensile flange which constitute a hollow rectangular section. In this reinforcement, the overall bending strength is enhanced by setting the thickness of the web so as to be larger on the side close to the compressive flange with respect to a neutral axis than that of the web on the side closer to the tensile flange.

Patent Literature 5 discloses a bumper reinforcement having three ribs. The plate thickness of the intermediate rib of the above-mentioned ribs is set larger than those of the other ribs, whereby the deterioration of energy absorbing capability upon buckling of the three ribs is prevented.

Patent Literature 6 discloses a structural member having a pair of flanges disposed in parallel to each other. In this structural member, an FRP material is provided on the surface of the flange on the tensed side upon receipt of bending load (the flange disposed oppositely to the flange on the compressed side) of both the flanges, and the ratio of width to thickness of the flange on the compressed side is set to 12 or less. This enhances the energy absorbing quantity of the structural member.

Patent Literature 7 discloses a composite structural member including a steel pipe and a reinforcement pipe inserted thereto. The reinforcement pipe has an outer shape along the inner wall of the steel pipe, and a rib is formed on the inside of the reinforcement pipe. This ensures a sufficient strength.

Patent Literature 8 discloses a filled structure including a hollow member and a filler inserted thereto. The filler is excellent in energy absorbing performance, and is fixed to the inside of the hollow member. In this filled structure, satisfactory corrosion resistance is ensured.

Patent Literature 9 discloses a vehicle body structural member composed of a plurality of members differed in strength. In this vehicle body structural member, this difference in strength of each member causes a twisting moment in the vehicle body structural member to disperse the bending load to the other members. Therefore, the energy absorbing efficiency of the vehicle body structural member is improved.

Patent Literature 10 discloses a bumper beam provided with a bumper reinforcing material. The bumper reinforcing material has a hollow part, and a crush deformation preventing body is disposed in the hollow part. The crush deformation preventing body suppresses buckling deformation of the bumper reinforcing member to enhance the impact energy absorbing capability.

The conventional structural members described above have the following problems when used as a bumper beam.

An automotive bumper beam requires a high bending strength in a high-speed collision of a pole-like object with the front or rear of a vehicle body. Namely, the automotive bumper beam has to transmit, in the collision with the pole-like object, the load to side members without its serious deformation.

However, a steel automotive bumper beam has limitation in improvement in bending strength because of insufficient exercise of sectional performance. The causes of the insufficient exercise of sectional performance include (i) deflection of a flange (vertically extending wall part), and (ii) compressive buckling of a web (longitudinally extending wall part).

On the other hand, it is desirable to enhance the bending strength of the bumper without increasing the weight of the bumper as much as possible.

With respect to the above-mentioned issue of (ii), since the buckling load of the web is proportional to the Young's modulus and the cube of plate thickness of the material, the buckling of the web can be suppressed more efficiently by increasing the thickness of the material than by improving the strength of the material. However, the increase in thickness is associated with significant increase in overall weight of the bumper beam. Particularly, in a steel automotive bumper beam manufactured by roll forming, an increased thickness of the web results in an increased overall weight of the beam in proportion thereto since the overall thickness of the bumper beam is uniform. Thus, remarkable improvement in the durability performance (to buckling) per unit weight cannot be expected. Further, as the background, reduction in overall weight of a vehicle is recently required for reduction in $CO_2$ emission.

Further, it is very difficult in manufacturing to attach a reinforcing material (addition product) within the automotive bumper beam, and the use of a large reinforcing material involves remarkable increase in weight and cost. On the other hand, the use of FRP (Fiber Reinforced Plastics) as a component of bumper beam for the purpose of reducing the weight offers little hope of preventing the compressive buckling of the beam.

[Patent Literature 1] Japanese Patent Application Laid-Open No. 11-334500
[Patent Literature 2] Japanese Patent Application Laid-Open No. 2006-218904
[Patent Literature 3] Japanese Patent Application Laid-Open No. 2005-8146
[Patent Literature 4] Japanese Patent Application Laid-Open No. 11-059296
[Patent Literature 5] Japanese Patent Application Laid-Open No. 2004-148915
[Patent Literature 6] Japanese Patent Application Laid-Open No. 2003-129611
[Patent Literature 7] Japanese Patent Application Laid-Open No. 2003-312404
[Patent Literature 8] Japanese Patent Application Laid-Open No. 2005-88651
[Patent Literature 9] Japanese Patent Application Laid-Open No. 2006-248336
[Patent Literature 10] Japanese Patent Application Laid-Open No. 2000-52897

DISCLOSURE OF THE INVENTION

The present invention has an object to provide a bumper beam, which can be improved in bending strength with minimum increase in weight.

A bumper beam according to a first aspect of the present invention, which is configured to be mounted on the front or rear of a vehicle body and to extend along a reference line, includes a beam body formed of a metallic plate and extending along the reference line, and a metallic first reinforcing plate extending along the reference line and attached to the beam body. In at least one cross section perpendicular to the reference line, the first reinforcing plate extends linearly, and the beam body includes a pair of swelling parts each swelling from the first reinforcing plate in a direction intersecting it while enclosing an internal space.

Further, the beam body and the first reinforcing plate satisfy the following condition:

$$(E_{st}/\rho_{st}^3) < (E_2/\rho_2^3)$$

$E_{st}$: Young's modulus of the beam body
$\rho_{st}$: Density of the beam body
$E_2$: Young's modulus of the first reinforcing plate
$\rho_2$: Density of the first reinforcing plate A bumper beam according to a second aspect of the present invention, which is configured to be mounted on the front or rear of a vehicle body and to extend along a reference line, includes a beam body formed of a metallic plate and extending along the reference line, and a metallic second reinforcing plate extending along the reference line and attached to the beam body. In at least one cross section perpendicular to the reference line, the beam body includes a reference wall extending linearly and a pair of swelling parts each swelling from the reference wall in a direction intersecting it while enclosing an internal space, each of the swelling parts has an outer wall part extending in a direction intersecting the reference wall, and an inner wall part extending in a direction intersecting the first reinforcing plate at a position closer to the other swelling part than the position of the outer wall part, and the outer wall parts and the inner wall parts are aligned along the reference wall. The second reinforcing plate is attached to at least either both the outer wall parts or both the inner wall parts in an attitude parallel thereto.

Further, the beam body and the second reinforcing plate satisfy the following condition.

$$(E_{st}/\rho_{st}^3) < (E_2/\rho_2^3)$$

$E_{st}$: Young's modulus of the beam body
$\rho_{st}$: Density of the beam body
$E_3$: Young's modulus of the second reinforcing plate
$\rho_3$: Density of the second reinforcing plate

EMBODIMENTS FOR CARRYING OUT THE INVENTION

First Embodiment

Figure 1:
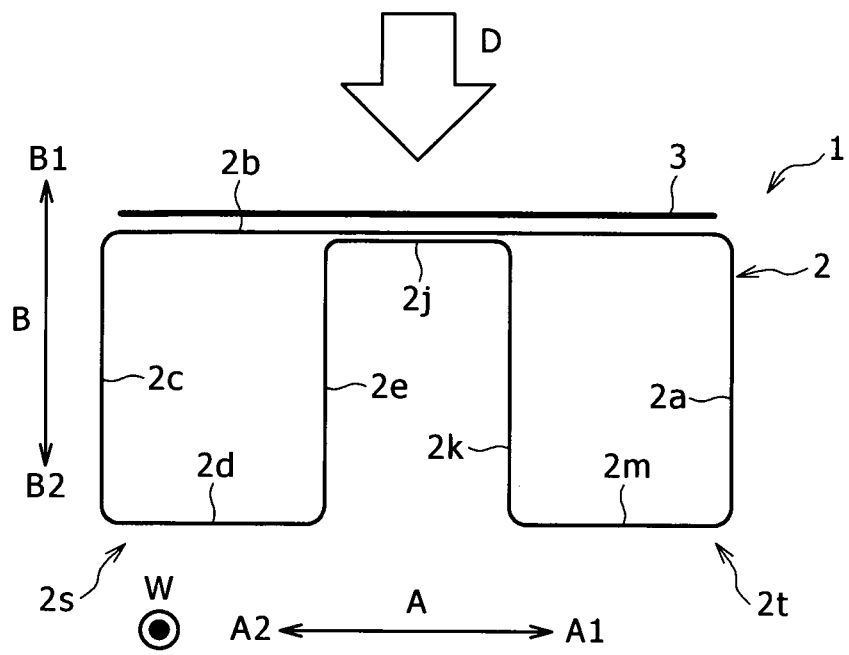
FIG. 1 is a cross sectional view of a bumper beam according to a first embodiment of the present invention, which shows a cross section taken along line I-I of FIG. 22.
Figure 22:
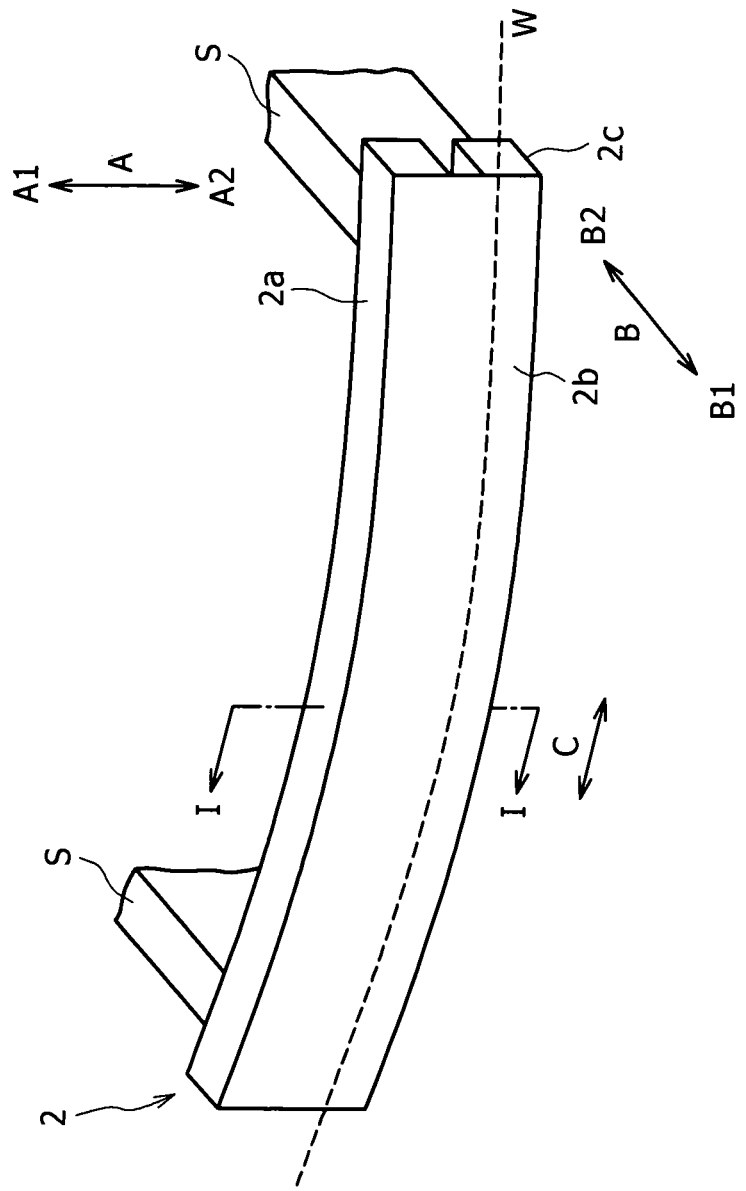
FIG. 22 is a perspective view of a beam body according to the first embodiment.

A bumper beam 1 in a first embodiment of the present invention will be described in reference to FIGS. 1 and 22. FIG. 1 is a cross sectional view of the bumper beam 1 according to the first embodiment of the present invention. FIG. 22 is a perspective view of a beam body according to the first embodiment. The cross section shown in FIG. 1 is at least one cross section (at least one of cross sections perpendicular to a reference line W) of the bumper beam 1, and FIG. 1 shows a cross section taken along line I-I of FIG. 22.

Each of cross sections shown in FIGS. 2, 4, 5, 6, 8, 9, 10, 11, 12, 13, 14, 15, 18, 20 and 21 which will be described later also corresponds to the cross section taken along line I-I of FIG. 22 similarly to FIG. 1.

(Structure of Bumper Beam)

The bumper beam 1 has a B-shaped cross section, as shown in FIG. 1, and includes a beam body 2 formed of a steel plate, and a reinforcing plate 3 formed of an aluminum-based material (aluminum or aluminum alloy). As shown in FIG. 22, the beam body 2 has an arch-like shape in which it extends along a reference line W shown by the dashed line, and curved in top view. The direction of the reference line W is substantially matched to width direction C (lateral direction; refer to the direction of arrow C in the drawing). More specifically, the reference line W is curved relative to the width direction. The cross section perpendicular to the reference line W which is shown in FIG. 1 can be said to be substantially perpendicular also to the width direction C.

The reinforcing plate 3 corresponds to the first reinforcing plate according to the present invention, and is disposed along the beam body 2. The reinforcing plate 3 also has an arch-like shape curved in top view similarly to the beam body 2.

A synthetic resin-made bumper cover (not shown) is attached to the bumper beam 1 so as to cover the bumper beam 1, whereby a bumper assembly is formed.

The bumper beam 1 according to this embodiment is mounted on the front of a vehicle body. Concretely, the beam body 2 is attached by welding to side members S (FIG. 22) that are beam members extending to the front and rear of the vehicle body at lateral positions of the vehicle body.

In the following description, the front side of the longitudinal direction B of the vehicle body (refer to the direction of arrow B in the drawings) is referred to as B2 side and the rear side to as B1 side. The B2 side corresponds to a side approaching the vehicle body along the longitudinal direction B (vehicle body side), and the B1 side corresponds to a side leaving the vehicle body along the longitudinal direction B. The upper side in the vertical direction A of the vehicle body (refer to the direction of arrow A in the drawings) is referred to as A1 side, and the lower side to as A2 side. The "collision direction" in the following description is a direction shown by arrow D in FIG. 1 or the like, which corresponds to the relatively advancing direction of a collision object on the assumption that the collision object and the vehicle body collide to each other in the longitudinal direction. Namely, the collision direction D in the following description is matched to the longitudinal direction.

(Beam Body)

The beam body 2 is composed of a plate material, and formed to be B-shaped in cross section perpendicular to the reference line W. Concretely, the beam body 2 has each wall part of a first wall (central flange) 2j, a second wall (inner web) 2k, a third wall (rear flange) 2m, a fourth wall (outer web) 2a, a fifth wall (inner web) 2e, a sixth wall (rear flange) 2d, a seventh wall (outer web) 2c, and an eighth wall (front flange; reference wall) 2b, and extends along the reference line W.

The first wall 2j is located at the center in the vertical direction A, and extends along the vertical direction A. The second wall 2k extends from the upper end of the first wall 2j toward the B2 side (to the side approaching the vehicle body) along the longitudinal direction B orthogonal to the first wall 2j. The third wall 2m extends upwardly from an end on the vehicle body side (B2 side) of the second wall 2k along the vertical direction A. The fourth wall 2a extends from the upper end of the third wall 2m toward the B1 side (the side leaving the vehicle body) along the longitudinal direction B.

The fifth wall 2e extends from the lower end of the first wall 2j toward the B2 side along the longitudinal direction B. The sixth wall 2d extends downwardly from an end on the vehicle body side of the fifth wall 2e. The seventh wall 2c extends from the lower end of the sixth wall 2d toward the B1 side along the longitudinal direction B.

The eighth wall 2b extends along the vertical direction A and connects an end on the B1 side of the fourth wall 2a to an end on the B1 side of the seventh wall 2c.

The first wall 2j and the eighth wall 2b are integrated together by welding so that the respective surfaces are closely fitted to each other. Each of the wall parts constituting the beam body 2 extends along the reference line W (refer to FIG. 22).

In this embodiment, the first wall 2j, the third wall 2m, the sixth wall 2d, and the eighth wall 2b are orthogonal to the longitudinal direction B, and the second wall 2k, the fourth wall 2a, the fifth wall 2e, and the seventh wall 2c are parallel to the longitudinal direction B (or orthogonal to the vertical direction A). If a wall part orthogonal to the longitudinal direction B is regarded as a flange, and a wall part parallel to the longitudinal direction B as a web, the first wall 2j, the third wall 2m, the sixth wall 2d, and the eighth wall 2b correspond to the flange, and the second wall 2k, the fourth wall 2a, the fifth wall 2e, and the seventh wall 2c correspond to the web.

The fourth wall 2a and the seventh wall 2c are outer webs parallel to the collision direction. The fifth wall 2e and the second wall 2k are inner webs parallel to the collision direction. The first wall 2j connects the fifth wall 2e to the second wall 2k. The eighth wall 2b is located on the upstream side in the collision direction shown by arrow D, and a surface on the B1 side of the eighth wall 2b constitutes a collision surface (a surface orthogonal to the collision direction).

In this embodiment, the plate thickness of each flange and each web in the beam body 2 is 1.4 mm. The Young's modulus of a steel product constituting the beam body 2 is 21,000 MPa, and the density thereof is 7,874 kg/m³.

In an optional cross section perpendicular to the reference line W, the reinforcing plate 3 extends along the vertical direction A. The fourth wall 2a, the third wall 2m and the second wall 2k constitute an upper swelling part 2t located above the first wall 2j and swelling from the reinforcing plate 3 toward the B2 side of the longitudinal direction B, and the fifth wall 2e, the sixth wall 2d and the seventh wall 2c constitute a lower swelling part 2s located below the first wall 2j and swelling from the reinforcing plate 3 toward the B2 side of the longitudinal direction B. Each of the swelling parts 2t and 2s encloses an internal space on the inside thereof.

The fourth wall 2a and the seventh wall 2c constitute, respectively, outer wall parts of the swelling parts 2t and 2s (wall parts extending from the reinforcing plate 3 in the direction orthogonal thereto on both the outer sides of the beam body 2), and the second wall 2k and the fifth wall 2e constitute inner wall parts of the swelling parts 2t and 2s (wall parts extending from the reinforcing plate 3 in the direction orthogonal thereto at a position closer to the other swelling part than the position of the outer wall part). These four wall parts (the fourth wall 2a, the second wall 2k, the fifth wall 2e and the seventh wall 2c) extend in the longitudinal direction B that is a direction intersecting the reinforcing plate 3, and are aligned along the vertical direction A.

In FIG. 1 showing a cross section perpendicular to the reference line W, each wall part is constituted as follows.

The second wall 2k extends from one end (the A1-side end) of the first wall 2j along a direction intersecting the first wall 2j (the longitudinal direction B). The third wall 2m extends from the B2-side end (an end opposite to the first wall 2j) of the second wall 2k along a direction intersecting the second wall 2k. The third wall 2m extends from the B2-side end of the second wall 2k to the A1 side (the side opposite to the first wall 2j in relation to the second wall 2k). The fourth wall 2a extends from the A1-side end (an end opposite to the second wall 2k) of the third wall 2m along a direction intersecting the third wall 2m. The fourth wall 2a also extends from the A1-side end of the third wall 2m to the B1 side (the side of the second wall 2k in relation to the third wall 2m).

The fifth wall 2e extends from the other end (the A2-side end) of the first wall 2j in a direction intersecting the first wall 2j. The fifth wall 2e also extends from the A2-side end of the first wall 2j to the B2 side (the same side as the second wall 2k in relation to the first wall 2j). The sixth wall 2d extends from a end on the B2 side (the side opposite to the first wall 2j) of the fifth wall 2e in a direction intersecting the fifth wall 2e. The sixth wall 2d extends also from the B2-side end of the fifth wall 2e to the A2 side (the side opposite to the first wall 2j in relation to the fifth wall 2e). The seventh wall 2c extends from an end on the A2 side (the side opposite to the fifth wall 2e) of the sixth wall 2d in a direction intersecting the sixth wall 2d. The seventh wall 2c extends from the A2-side end of the sixth wall 2d to the B1 side (the side of the fifth wall 2e in relation to the sixth wall 2d).

The eighth wall 2b constitutes a reference wall. Namely, the eighth wall 2b extends along a direction parallel to the reinforcing plate 3 or the vertical direction A, and connects an end part opposite to the third wall 2m of end parts of the fourth wall 2a as the outer wall part to an end part opposite to the sixth wall 2d of end parts of the seventh wall 2c as the similarly outer wall part while closing the internal space inside each of the swelling parts 2t and 2s. The eighth wall 2b extends also in the extending direction of the first wall 2j.

(Reinforcing Plate)

The reinforcing plate 3 is attached to the beam body 2 so as to extend along the reference line W, to extend along the vertical direction A in an optional cross section orthogonal to the reference line W, and to be perpendicular to the longitudinal direction B. The reinforcing plate 3 is attached to the B1-side end part (an end away from the vehicle body) of the beam body 2. Concretely, the reinforcing plate 3 is disposed on the collision surface side (B1 side) of the beam body 2, and attached to the eighth wall 2b of the beam body 2 by welding so that the respective surfaces are closely fitted to each other.

The reinforcing plate 3 according to this embodiment is attached to all over the whole front surface of the eighth wall 2b to thereby reinforce the eighth wall 2b. Namely, the reinforcing plate 3 in this embodiment functions as a reinforcing material of the beam body 2, particularly, as a reinforcing material of the eighth wall 2b. The thickness of the reinforcing plate 3 in this embodiment is 2.0 mm. The Young's modulus of the aluminum-based material constituting the reinforcing plate 3 is 6,900 MPa, and the density thereof is 2,700 kg/m³. The reinforcing plate 3 may be formed of another metallic material without being limited to the aluminum-based material.

In FIG. 1 showing a cross section perpendicular to the reference line W, the reinforcing plate 3 extends linearly along the extending direction of the first wall 2j (the vertical direction A), and is attached to the B1-side end part (the side opposite to the third wall 2m and the sixth wall 2d) of the beam body 2 in relation to the direction perpendicular to the first wall 2j (longitudinal direction B).

Second Embodiment

Figure 2:
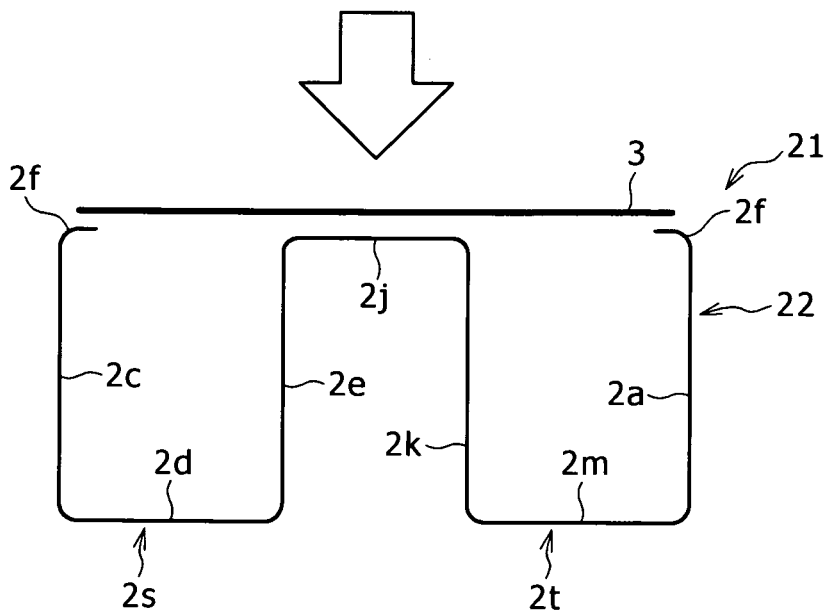
FIG. 2 is a cross sectional view of a bumper beam according to a second embodiment of the present invention.

A bumper beam 21 in a second embodiment of the present invention will be described in reference to FIG. 2. With respect to the same part as in the above-mentioned embodiment, the same reference number is assigned in the drawing to omit the description therefor. FIG. 2 is a cross sectional view of the bumper beam 21 according to the second embodiment. The points different from the above-mentioned embodiment are mainly described below without the description for the same items as in the above-mentioned embodiment.

The bumper beam 21 according to this embodiment also includes a beam body 22 and a reinforcing plate 3. The bumper beam 21 is formed to be B-shaped in cross section as shown in FIG. 2. However, the beam body 22 (corresponding to the above-mentioned beam body 2) according to this embodiment does not include the eighth wall 2b, different from the above-mentioned beam body 2, in which the respective B1-side end parts of the fourth wall 2a and the seventh wall 2c are free ends. These end parts constitute overhang parts 2f overhanging inwardly from the other parts of the fourth wall 2a and the seventh wall 2c with root parts thereof being curved. The respective overhang parts 2f of the fourth wall 2a and the seventh wall 2c overhang to the lower side (the A2 side) and to the upper side (the A1 side) respectively. The reinforcing plate 3 is attached to the B1-side surfaces of both the overhang parts 2f by welding so as to be closely fitted to both the surfaces.

The B1-side surface of the reinforcing plate (first reinforcing plate) 3 constitutes a collision surface. In this bumper beam 21, the reinforcing plate 3 functions as an alternate member of the eighth wall 2b in the beam body 2, and functions as an overall reinforcing material of the beam body 22.

(Young's Modulus and Density)

The relation between Young's modulus and density in the first embodiment and the second embodiment will be then described. As a typical example, the structure of the bumper beam 21 is described below.

If the Young's modulus of the beam body 22 is shown as $E_{st}$, the density of the beam body 22 as $\rho_{st}$, the Young's modulus of the reinforcing plate 3 as $E_2$, and the density of the reinforcing plate 3 as $\rho_2$, $E_{st}$, $E_2$, $\rho_{st}$ and $\rho_2$ in the bumper beam 21 satisfy a condition represented by the following expression (1). In other words, the steel product that is the material of the beam body 22 and the aluminum-based material that is the material of the reinforcing plate 3 are selected so as to satisfy this condition.

$$(E_{st}/\rho_{st}^3) < (E_2/\rho_2^3) \tag{1}$$

The reason for selecting each material according to the expression (1) will be described. Assuming that the buckling length of the reinforcing plate 3 is constant, the buckling load $P_{cr}$ of the reinforcing plate is represented by the following expression 2, wherein t is the thickness of the reinforcing plate 3, and E is the Young's modulus of the reinforcing plate 3.

$$P_{cr} \propto E \cdot t^3 \quad (2)$$

According to the expression (2); the beam body 22 can be effectively reinforced by satisfying the relation of the following expression (3), wherein $E_{st}$ is the Young's modulus of the beam body 22, $t_{st}$ is the thickness of the beam body 22, $E_2$ is the Young's modulus of the reinforcing plate 3, and $t_2$ is the thickness of the reinforcing plate 3.

$$E_{st} \cdot t_{st}^3 < E_2 \cdot t_2^3 \quad (3)$$

On the other hand, the weight W of a certain material is represented by the following expression (4), wherein ρ is the density of the material.

$$W \propto \rho \cdot t \quad (4)$$

When the reinforcing plate 3 is provided so that the weight of a "portion subjected to attachment" of the beam body 22 is equal to the weight of the reinforcing plate 3, the relation of the following expression (5) is satisfied. The area of the portion subjected to attachment is equal to the area of the reinforcing plate.

$$\rho_{st} \cdot t_{st} = \rho_2 \cdot t_2 \quad (5)$$

The "portion subjected to attachment" means the eighth wall 2b itself (i) when the reinforcing plate 3 is attached to the eighth wall 2b that is the reference wall as the reinforcing material of the eighth wall 2b as in the first embodiment. In contrast, (ii) when the reinforcing plate 3 functions as an alternate member of the eighth wall 2b without the eighth wall 2b as in the second embodiment (refer to the second embodiment), a reference wall corresponding to the eighth wall which has the same thickness as the first to the seventh wall is virtually determined, and this virtual wall corresponds to the portion subjected to attachment.

The above-mentioned relation of the expression (1) is derived from the above-mentioned expressions (5) and (3). Thus, the buckling load per weight (Pcr/W) can be efficiently improved by reinforcing the B1 side of the beam body 22 with a material such that it satisfies the condition of the expression (1).

Further, each of the embodiments will be concretely described.

(i) In the first embodiment in which the reinforcing plate 3 functions as a reinforcing material of the eighth wall 2b, when the reinforcing plate 3 having substantially the same weight as the "eighth wall 2b" is attached to the beam body 2, for example, the total weight of the eighth wall 2b and the reinforcing plate 3 is about twice the weight of the eighth wall 2b, while the buckling load of the eighth wall 2b and the reinforcing plate 3 is larger than twice the buckling load of the eighth wall 2b.

(ii) In the second embodiment in which the reinforcing plate 3 functions as an alternate member of the eighth wall 2b, when the reinforcing plate 3 having substantially the same weight as the "eighth wall 2b" is attached to the beam body 22, for example, the weight of the reinforcing plate 3 corresponding to the front wall of the bumper beam 21 composed of the beam body 22 and the reinforcing plate 3 is substantially equal to that of the eighth wall 2b corresponding to the front wall of the beam body 2, while the buckling load of the reinforcing plate 3 becomes larger than that of the eighth wall 2b of the beam body 2.

In the above-mentioned two embodiments, the condition of the expression (1) is satisfied with $E_{st}/\rho_{st}^3 = 4.30 \times 10^{\wedge}(-8)$ [MPa·m/kg$^3$] and $E_2/\rho_2^3 = 3.51 \times 10^{\wedge}(-7)$ [MPa·m/kg$^3$], wherein $E_{st} = 21{,}000$ MPa, $E_2 = 6{,}900$ MPa, $\rho_{st} = 7{,}874$ kg/m$^3$, and $\rho_2 = 2{,}700$ kg/m$^3$.

The bumper beam has only to satisfy at least the condition shown in the expression (1), and does not always have to satisfy the condition shown in the expression (5).

(Simulation Result of Bending Moment)

Results of evaluation for bending moment in bumper beam will be then described. In the evaluation, with respect to five types of bumper beams (bumper beams of single steel differed in plate thickness, a bumper beam of flange steel-reinforcement, a bumper beam of flange aluminum-reinforcement (1), and a bumper beam of flange aluminum-reinforcement (2)), calculation of maximum bending moment was performed by three-point bending analysis.

The "bumper beam of single steel" is a bumper bean free from the reinforcing plate 3, and corresponds to the beam body 2. The "bumper beam of flange steel-reinforcement" is the bumper beam 1 shown in FIG. 1, wherein the reinforcing plate 3 is made of steel. The "bumper beam of flange aluminum-reinforcement (1)" is the bumper beam 1 according to the first embodiment, and the "bumper beam of flange aluminum-reinforcement (2)" is the bumper beam 21 according to the second embodiment shown in FIG. 2. The three-point bending analysis was performed while taking the center of the sixth wall 2d and the center of the third wall 2m respectively as fulcrum points, and the center of the reinforcing plate 3 as a loading point.

Each of the bumper beam 1 and the bumper beam 21 can be regarded as a beam in which portions near both ends thereof (both ends related to the width direction C) are supported by side members. Therefore, the reinforcing material resists a load received by the bumper beam at the time of collision by bending action (in a state where the bending action is dominant). Thus, the larger the maximum bending moment bearable (durable) by the bumper beam is, the higher the bending strength of the bumper beam is.

As the plate material constituting the beam body 2 and the beam body 22, steel plate of 1,470 MPa-class with yield strength ($Y_P$) of 1,200 MPa was used, and as the material of the reinforcing plate 3, 7,000-series aluminum alloy with yield strength ($Y_P$) of 310 MPa was used. The yield strength and thickness of the steel plate constituting each beam body, and the yield strength and thickness of the aluminum-based material constituting the reinforcing plate are shown in Table 1.

TABLE 1

|  | Steel Plate | | Aluminum Plate | |
| --- | --- | --- | --- | --- |
|  | Yield Strength (MPa) | Thickness (mm) | Yield Strength (MPa) | Thickness (mm) |
| Single Steel | 1200 | 1.4 | — | — |
| Single Steel | 1200 | 2.0 | — | — |
| Flange Steel-Reinforcement | 1200 | 1.4 | — | — |
| Flange Aluminum-Reinforcement (1) | 1200 | 1.4 | 310 | 2.0 |
| Flange Aluminum-Reinforcement (2) | 1200 | 1.4 | 310 | 2.0 |

Figure 3:
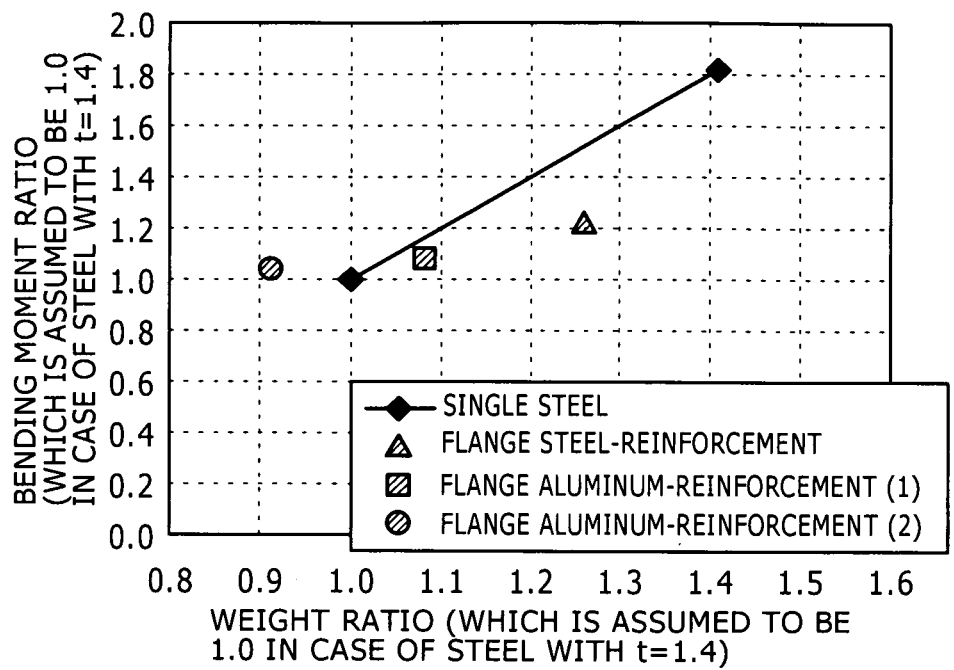
FIG. 3 is a graph showing a simulation result of maximum bending moment by three-point bending analysis.

FIG. 3 shows the results of the above-mentioned simulation of maximum bending moment by three-point bending analysis as a graph. In the graph of FIG. 3, the horizontal axis shows a weight ratio based on the weight of 1.4-mm-thick steel product (1.0), and the vertical axis shows a maximum bending moment ratio based on the maximum bending moment (bending moment in buckling) in 1.4-mm-thick steel product. In FIG. 3, also, of two points showing the results for the single steels, the point with weight ratio of 1.43 shows the result for the bumper beam 2.0 mm in thickness.

It is found from the graph of FIG. 3 that, with respect to the bumper beam of single steel 1.4 mm in thickness (hereinafter referred to as bumper beam BS), the maximum bending moment is enhanced, upon increase in thickness of the steel plate from 1.4 mm to 2.0 mm, and the overall weight of the bumper beam is also increased. In the bumper beam of flange steel-reinforcement, since the eighth wall 2b is reinforced with a steel plate, the maximum bending moment ratio is enhanced (bending moment ratio: about 1.2), compared with the bumper beam BS, but the overall weight of the bumper beam is also increased just as much as the weight of the steel plate (weight ratio: about 1.25).

It is also found from the graph of FIG. 3 that, in the bumper beam 1 of flange aluminum-reinforcement (1), since the eighth wall 2b is reinforced with the reinforcing plate 3, the maximum bending moment ratio is enhanced (bending moment ratio: about 1.1), compared with the bumper beam BS, but the overall weight of the bumper beam is also increased just as much as the weight of the reinforcing plate 3 (weight ratio: about 1.08).

In contrast to the above, the bumper beam 21 of flange aluminum-reinforcement (2) is equal to the bumper beam BS with respect to the maximum bending moment ratio (bending moment ratio: about 1.05), although the weight is reduced (weight ratio: about 0.91), compared with the bumper beam BS, since it is free from the eighth wall 8b.

As described above, the bumper beam is effectively reinforced by fixing a reinforcing plate formed of aluminum or steel to the B1 side of the beam body formed of steel. Further, the Young's moduli and densities of the beam body and the reinforcing plate satisfy the condition shown in the expression (1), whereby the bending strength can be improved while minimizing the increase in weight.

Summary of Embodiments

The summary of the bumper beams of the first embodiment and the second embodiment will be described again. As a typical structure; the bumper beam 21 shown in FIG. 2 is illustrated below. The bumper beam 21, which is configured to be mounted on the front of a vehicle body and to extend along a reference line W, includes a beam body 22 formed of a steel plate and extending along the reference line W, and an aluminum-made reinforcing plate (first reinforcing plate) 3 extending along the reference line W and attached to the beam body 22.

In an optional cross section perpendicular to the reference line W of the bumper beam 21, (a) the reinforcing plate 3 extends linearly, and (b) the beam body 22 has an upper swelling part 2t and a lower swelling part 2s each swelling from the reinforcing plate 3 in a direction intersecting it while enclosing an internal space. Namely, the cross section has a B-shape. The beam body 22 and the reinforcing plate 3 satisfy the following condition.

$$(E_{st}/\rho_{st}^3) < (E_2/\rho_2^3)$$

$E_{st}$: Young's modulus of the beam body
$\rho_{st}$: Density of the beam body
$E_2$: Young's modulus of the reinforcing plate
$\rho_2$: Density of the reinforcing plate In this bumper beam 21, the reinforcing plate 3 formed of aluminum-based material is disposed on the front part of the beam body 22, whereby the beam body 22 is reinforced. The Young's moduli and densities of the beam body 22 and the reinforcing plate 3 satisfy the above-mentioned condition, whereby the bending strength of the bumper beam 21 can be increased while minimizing the increase in weight of the bumper beam 21. In other words, the bending strength of the bumper beam 21 can be improved while minimizing the increase in weight of the bumper beam 21 by manufacturing the bumper beam so as to satisfy the above-mentioned condition. This manufacturing method includes an attachment step of attaching the reinforcing plate 3 to the beam body 22.

Third Embodiment

Figure 4:
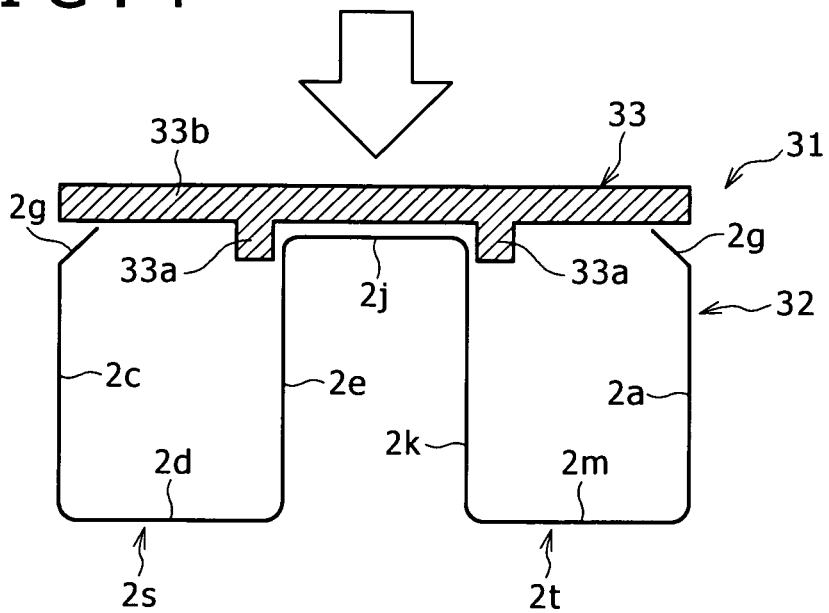
FIG. 4 is a cross sectional view of a bumper beam according to a third embodiment of the present invention.

A bumper beam 31 in a third embodiment of the present invention will be described in reference to FIG. 4. With respect to the same part as in the above-mentioned embodiments, the same reference number is assigned in the drawing to omit the description therefor. FIG. 4 is a cross sectional view of the bumper beam according to the third embodiment. The points different from the above-mentioned embodiments are mainly described below without the description for the same items as in the above-mentioned embodiments.
(Structure of Bumper Beam)

The bumper beam 31 has a beam body 32 formed of a steel plate and an aluminum-made reinforcing plate (first reinforcing plate) 33. The bumper beam 31 is B-shaped in cross section as shown in FIG. 4. The beam body 32 according to this embodiment (corresponding to the above-mentioned beam body 2) is free from the eighth wall 8b similarly to the beam body 22. Overhang parts 2g overhanging linearly are formed on the B1-side end parts of the fourth wall 2a and the seventh wall 2c respectively. The two overhang parts 2g of the fourth wall 2a and the seventh wall 2c overhang upwardly and downwardly toward the B1 side respectively. Namely, the two overhang parts 2g are inclined relative to both the longitudinal direction B and the vertical direction A. The reinforcing plate 33 is attached to the B1-side tips of the two overhang parts 2g.

The reinforcing plate 33 is formed by extrusion-molding an aluminum-based material, and a surface on the B1 side of the reinforcing plate 33 constitutes a collision surface. In the bumper beam 31, the reinforcing plate 33 functions as an alternate member of the eighth wall 2b in the beam body 2 shown in FIG. 1, and functions as a reinforcing material of the beam body 32.

The reinforcing plate 33 has a body part 33b, and two projection parts (first projection parts) 33a projecting from the inside surface (a surface opposite to the collision surface) of the body part 33b.

The body part 33b extends along the reference line W and also along the vertical direction A, and has a thickness of about 10 mm.

Both the projection parts 33a are disposed to project along the longitudinal direction B, and to hold the second wall 2k and the fifth wall 2e (the respective inner wall parts of the swelling parts 2t and 2s) from both the outer sides in the vertical direction A of the vehicle body. The projecting direction of both the projection parts 33a is a direction intersecting the reinforcing plate 33, which is orthogonal to the reinforcing plate 33 in the example of the drawing. However, the projecting direction does not have to be always orthogonal to the reinforcing plate 33, and may be inclined relative to the normal to the reinforcing plate 33. Both the projection parts 33a are located at angle parts formed by the body part 33b and two inner webs, or the second wall 2k and the fifth wall 2e, respectively, to reinforce the corresponding inner webs.

If the Young's modulus of the beam body 32 is $E_{st}$, the density of the beam body 32 is $\rho_{st}$, the Young's modulus of the reinforcing plate 33 is $E_2$, and the density of the reinforcing plate 33 is $\rho_2$, $E_{st}$, $\rho_{st}$, $E_2$ and $\rho_2$ satisfy the above-mentioned expression (1).

(Effect of Bumper Beam 31)

In the above-mentioned bumper beam 31, buckling of the second wall 2k and the fifth wall 2e (buckling in which the middle portion of the second wall 2k and the middle portion of the fifth wall 2e are deformed to separate from each other) is suppressed by holding the second wall 2k and the fifth wall 2e from both the outer sides by the two projection parts (first projection parts) 33a projecting from the reinforcing plate 33 in the direction intersecting it (orthogonal in the drawing), whereby the bending strength of the bumper beam is further improved.

Both the projection parts 33a may be joined to the respective inner webs by welding, adhesion or the like.

Fourth Embodiment

Figure 5:
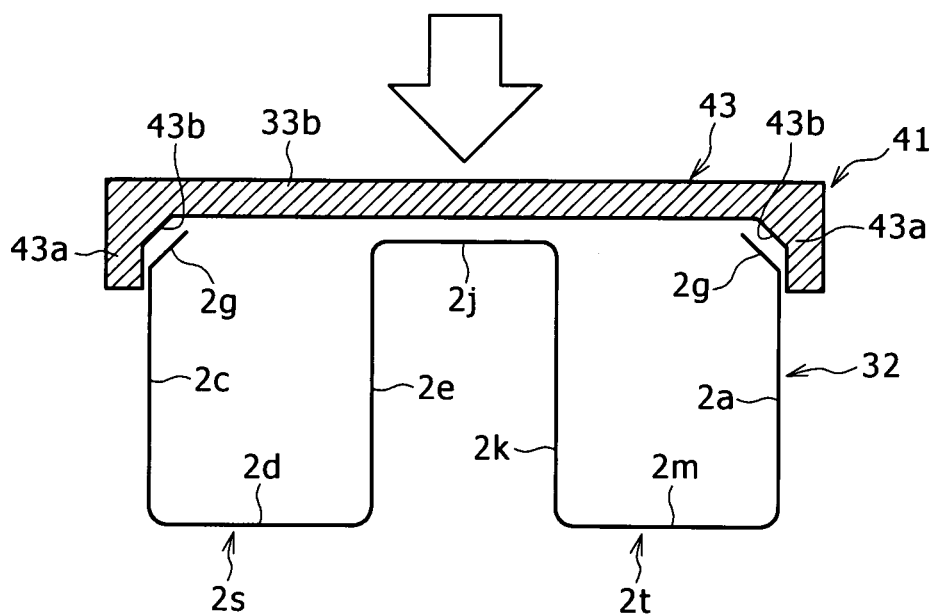
FIG. 5 is a cross sectional view of a bumper beam according to a fourth embodiment of the present invention.

A bumper beam 41 in a fourth embodiment of the present invention will be described in reference to FIG. 5. With respect to the same part as in the above-mentioned embodiments, the same reference number is assigned in the drawing to omit the description therefor. FIG. 5 is a cross sectional view of the bumper beam 41 according to the fourth embodiment. The points different from the above-mentioned embodiments are mainly described below without the description for the same items as in the above-mentioned embodiments.

The bumper beam 41 has a beam body 32 and an aluminum-made reinforcing plate (first reinforcing plate) 43. The bumper beam 41 has a B-shaped cross section as shown in FIG. 5.

The reinforcing plate 43 (corresponding to the above-mentioned reinforcing plate 33) is formed by extrusion molding, and has a collision surface. In the bumper beam 41, the reinforcing plate 43 functions as an alternate member of the eighth wall 2b in the beam body 2, and functions as a reinforcing material of the beam body 32.

The reinforcing plate 43 has a body part 33b and two projection parts (second projection parts) 43a projecting from the inside surface (a surface opposite to the collision surface) of the body part 33b. These projection parts 43a are disposed to project along the longitudinal direction B and to hold the fourth wall 2a and the seventh wall 2c (or the outer wall parts of the swelling parts 2t and 2s) from both the outer sides in the vertical direction A of the vehicle body. The projecting direction of both the projection parts 43a is a direction intersecting the reinforcing plate 43, which is orthogonal to the reinforcing plate 43 in the example of the drawing. However, the projecting direction may be inclined relative to the normal to the reinforcing plate 43. Both the projection parts 43a are located at angle parts formed by the body part 33b and two outer webs, or the fourth wall 2a and the seventh wall 2c, respectively, to reinforce the corresponding outer webs.

An inclined surface (a surface inclined relative to the vertical direction A and the longitudinal direction B) 43b having an inclination angle capable of surface-contacting with each of the overhang parts 2g of the beam body 32 is formed inside the root part of each projection part 43a, and integrated to the corresponding overhang part 2b so that the surface of the inclined surface 43b is closely fitted to the surface of this overhang part 2g. The reinforcing plate 43 is attached to both the overhang parts 2g that are the B1-side end parts in the beam body 32.

If the Young's modulus of the beam body 32 is $E_{st}$, the density of the beam body 32 is $\rho_{st}$, the Young's modulus of the reinforcing plate 43 is $E_2$, and the density of the reinforcing plate 43 is $\rho_2$, $E_{st}$, $\rho_{st}$, $E_2$ and $\rho_2$ satisfy the above-mentioned expression (1).

(Effect of Bumper Beam 41)

In the bumper beam 41, buckling of the fourth wall 2a and the seventh wall 2c (buckling in which the middle portion of the fourth wall 2a and the middle portion of the seventh wall 2c are deformed to separate from each other) is suppressed by holding the fourth wall 2a and the seventh wall 2e from both the outer sides by the two projection parts (second projection parts) 43a projecting from the reinforcing plate 43 in the direction intersecting it (orthogonal in the drawing), whereby the bending strength of the bumper beam is further improved.

Both the projection parts 43a may be joined to the respective outer webs by means of welding, adhesion or the like.

Fifth Embodiment

Figure 6:
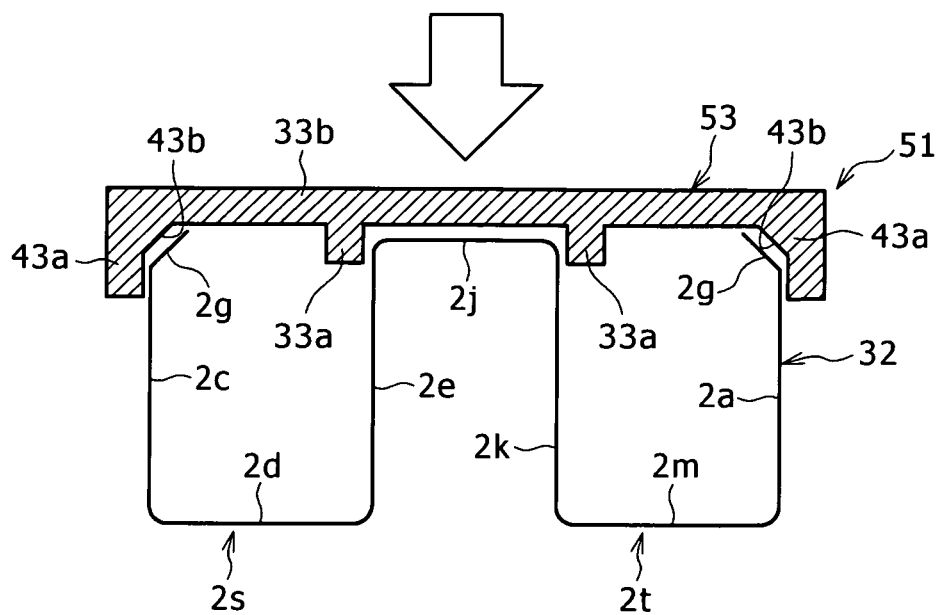
FIG. 6 is a cross sectional view of a bumper beam according to a fifth embodiment of the present invention.

A bumper beam 51 in a fifth embodiment of the present invention will be described in reference to FIG. 6. With respect to the same part as in the above-mentioned embodiments, the same reference number is assigned in the drawings to omit the description therefor. FIG. 6 is a cross sectional view of the bumper beam 51 according to the fifth embodiment. The points different from the above-mentioned embodiments are mainly described below without the description for the same items as in the above-mentioned embodiments.

The bumper beam 51 has a beam body 32 and an aluminum-made reinforcing plate (first reinforcing plate) 53, as shown in FIG. 6, and has a B-shaped cross section.

The reinforcing plate 53 (corresponding to the above-mentioned reinforcing plate 33) is formed by extrusion molding, and has a collision surface. In the bumper beam 51, the reinforcing plate 53 functions as an alternate member of the eighth wall 2b in the beam body 2, and functions as a reinforcing material of the beam body 32. The reinforcing plate 53 includes a body part 33b, two projection parts 43a projecting from the inside surface (a surface opposite to the collision surface) of the body part 33, and two projection parts 33a projecting from the inside surface within an area sandwiched between the projection parts 43a. Namely, the reinforcing plate 53 according to this embodiment has both the projection parts 33a corresponding to a pair of first projection parts and the projection parts 43a corresponding to a pair of second projection parts.

If the Young's modulus of the beam body 32 is $E_{st}$, the density of the beam body 32 is $\rho_{st}$, the Young's modulus of the reinforcing plate 53 is $E_2$, and the density of the reinforcing plate 53 is $\rho_2$, $E_{st}$, $E_2$, $\rho_{st}$ and $\rho_2$ satisfy the above-mentioned expression (1).

(Simulation Result of Bending Moment)

Results of evaluation for bending moment in bumper beam will be then described. In the evaluation, with respect to five types of bumper beams (two types of bumper beams of single steel differed in plate thickness, a bumper beam of flange aluminum-reinforcement (3), a bumper beam of flange aluminum-reinforcement (4), and a bumper beam of flange aluminum-reinforcement (5)), calculation of bending moment of each bumper beam is performed by three-point bending analysis.

The "bumper beam of single steel" is a bumper bean free from the reinforcing plate 3, and corresponds to the beam body 2. The "bumper beam of flange aluminum-reinforcement (3)" is the bumper beam 31 shown in FIG. 4, the "bumper beam of flange aluminum-reinforcement (4)" is the bumper beam 41 shown in FIG. 5, and the "bumper beam of flange aluminum-reinforcement (5)" is the bumper beam 51 shown in FIG. 6. The three-point bending analysis was performed while taking two points of the center of the sixth wall 2d and the center part of the third wall 2m as fulcrum points, and the center of the reinforcing plate 3 as a loading point.

As the plate material constituting the beam body 2 and the beam body 32, steel plate of 1,500 MPa-class with yield strength ($Y_P$) of 1,200 MPa was used, and as the material of the reinforcing plate 33 (the reinforcing plate 43 and the reinforcing plate 53), 7,000-series aluminum alloy with yield strength ($Y_P$) of 310 MPa was used. The yield strength and plate thickness of the steel plate constituting each beam body, and the yield strength and plate thickness of the aluminum-based material constituting the reinforcing plate are shown in Table 2.

TABLE 2

| | Steel Plate | | Aluminum Plate | |
|---|---|---|---|---|
| | Yield Strength (MPa) | Thickness (mm) | Yield Strength (MPa) | Thickness (mm) |
| Single Steel | 1200 | 1.4 | — | — |
| Single Steel | 1200 | 2.0 | — | — |
| Flange Aluminum-Reinforcement (3) | 1200 | 1.4 | 310 | — |
| Flange Aluminum-Reinforcement (4) | 1200 | 1.4 | 310 | — |
| Flange Aluminum-Reinforcement (5) | 1200 | 1.4 | 310 | — |

Figure 7:
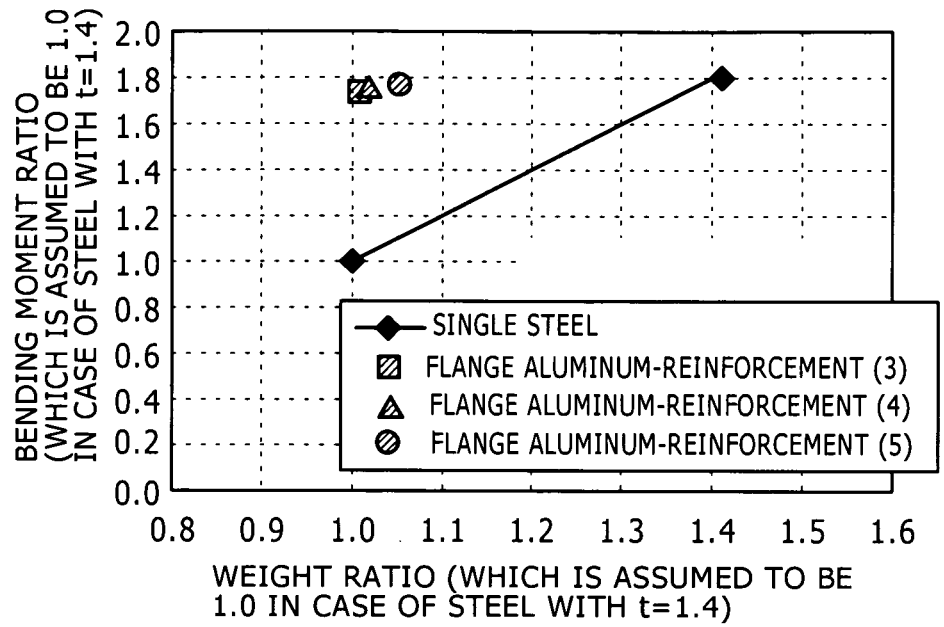
FIG. 7 is a graph showing a simulation result of maximum bending moment by three-point bending analysis.

FIG. 7 shows the results of the simulation of maximum bending moment by three-point bending analysis as a graph. It is found from the graph of FIG. 7 that, in the bumper beams of single steel, similarly to FIG. 3, the maximum bending moment ratio is increased, upon increase in thickness of the steel plate, and the overall weight of the bumper beam is also increased.

It is also found from FIG. 7 that the bumper beams of flange aluminum-reinforcements (3), (4) and (5) (the bumper beam 31, the bumper beam 41, and the bumper beam 51) are equal to the bumper beam of single steel 2.0 mm in thickness with respect to the maximum bending moment ratio, although their weights are substantially equal to that of the bumper beam of single steel 1.4 mm in thickness (weight ratio: about 1.0 to 1.5). Namely, when compared at the same weight ratio (about 1.0), the maximum bending moment ratios of the beams of flange aluminum-reinforcements (3), (4) and (5) are larger than the maximum bending moment of the bumper beam BS.

As described above, the bumper beam is reinforced by disposing a reinforcing plate formed of aluminum on the B1 side of the beam body 32 formed of steel. Further, the Young's moduli and densities of the beam body and the reinforcing plate satisfy the relation of the expression (1), whereby the bending strength can be improved while minimizing the increase in weight.

Modification Example

Figure 8:
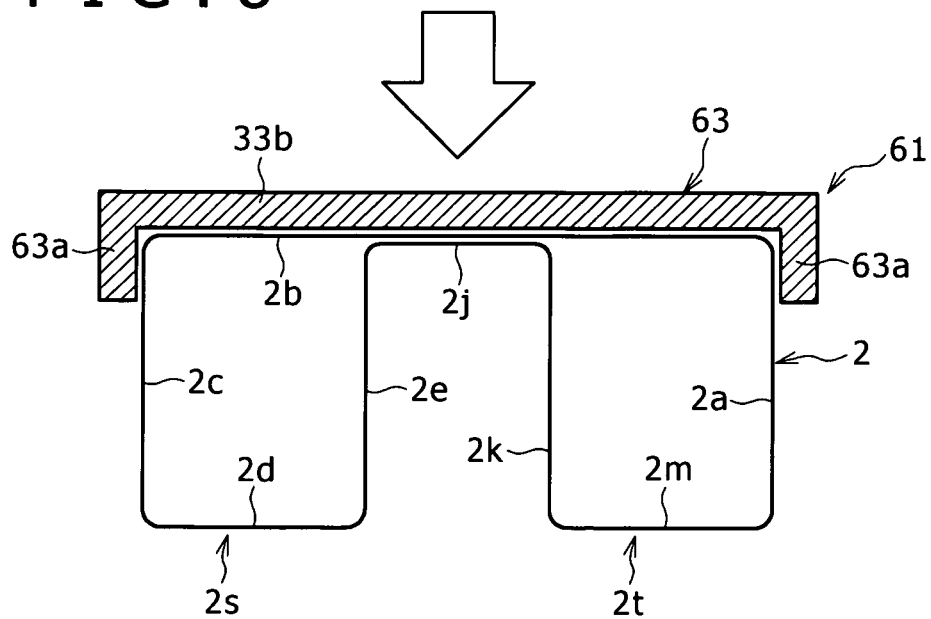
FIG. 8 is a cross sectional view of a bumper beam according to a first modification example.
Figure 9:
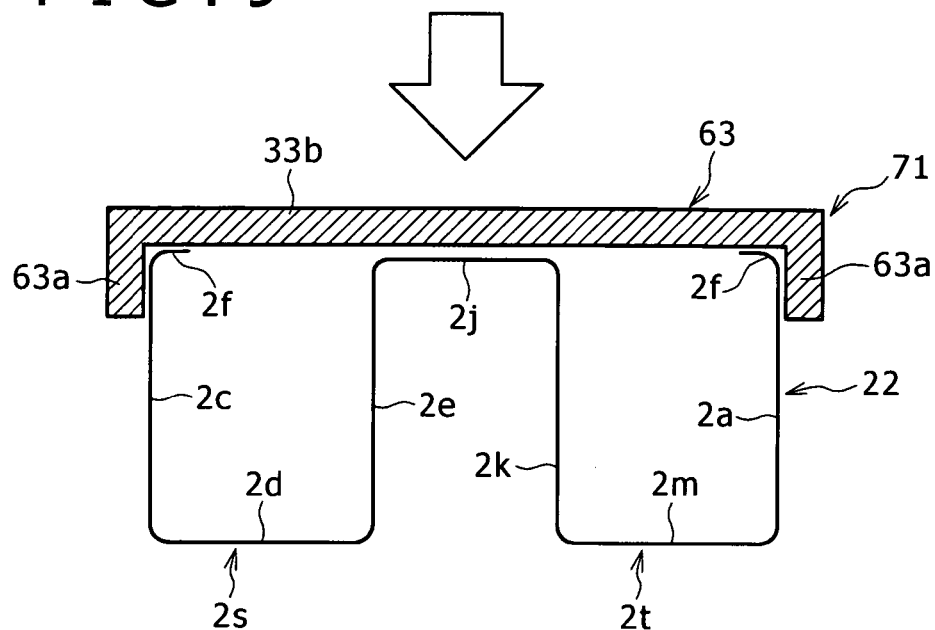
FIG. 9 is a cross sectional view of a bumper beam according to a second modification example.
Figure 10:
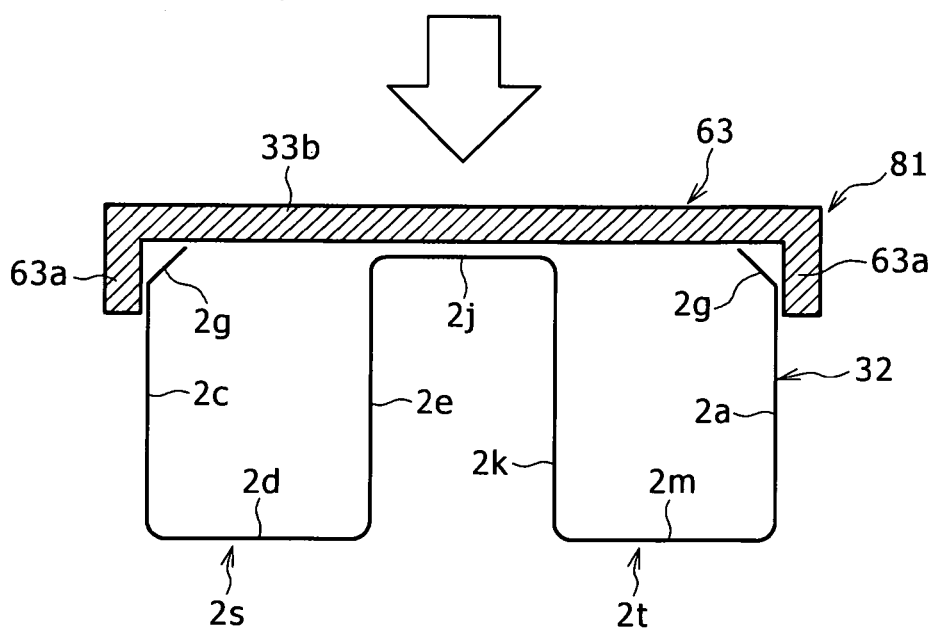
FIG. 10 is a cross sectional view of a bumper beam according to a third modification example.
Figure 11:
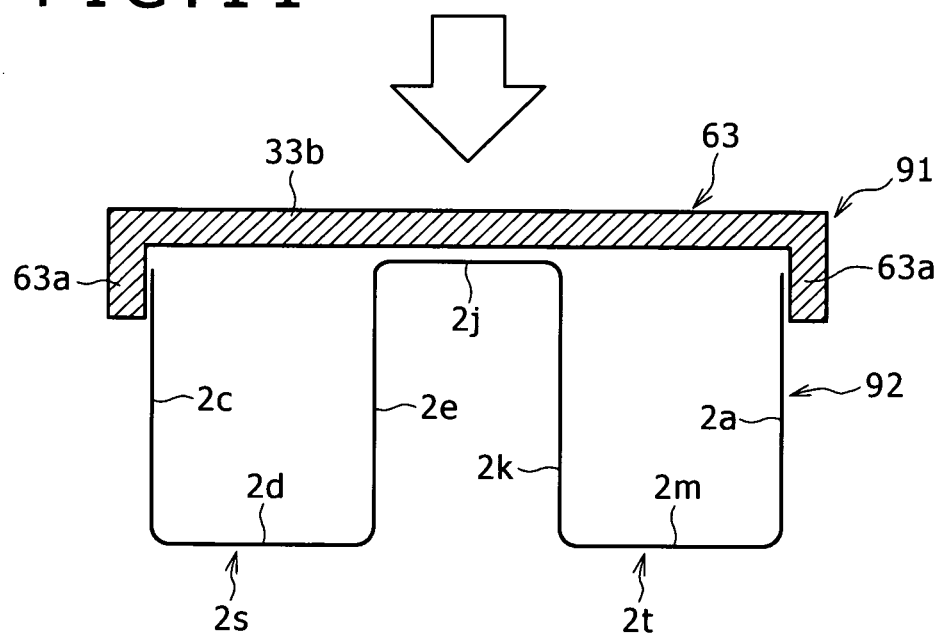
FIG. 11 is a cross sectional view of a bumper beam according to a fourth modification example.

The concrete structures of bumper beam may include, for example, those shown in FIGS. 8 to 11 without being limited to the above. Modification examples shown in FIGS. 8 to 11 will be then described. With respect to the same part as in the above-mentioned embodiments, the same reference number is assigned in the drawings to omit the description therefor. FIG. 8 is a cross sectional view of a bumper beam 61 according to a first modification example. FIG. 9 is a cross sectional view of a bumper beam 71 according to a second modification example. FIG. 10 is a cross sectional view of a bumper beam 81 according to a third modification example. FIG. 11 is a cross sectional view of a bumper beam 91 according to a fourth modification example. The points different from the above-mentioned third to fifth embodiments are mainly described below without the description for the same items as in the above-mentioned third to fifth embodiments.

The bumper beam 61 shown in FIG. 8 includes a beam body 2 and an aluminum-made reinforcing plate (first reinforcing plate) 63, and has a B-shaped cross section.

In the bumper beam 61, the reinforcing plate 63 is attached to all over the whole front surface of the eighth wall 2b to reinforce the eighth wall 2b. Namely, the reinforcing plate 63 in this embodiment functions as a reinforcing material of the eighth wall 2b. The reinforcing plate 63 is attached to the eighth wall 2b by welding so that the respective surfaces are closely fitted to each other.

The reinforcing plate 63 has a body part 33b and two projection parts (second projection parts) 63a projecting from the inside surface (a surface opposite to the collision surface) of the body part 33b. Both the projection parts 63a (corresponding to the above-mentioned projection parts 43a) are formed to project along the longitudinal direction B and to hold the fourth wall 2a and the seventh wall 2c (or the respective outer wall parts of the swelling parts 2t and 2s) from both the outer sides in the vertical direction A of the vehicle body. Both the projection parts 63a are located at angle parts formed by the body part 33b and two outer webs, or the fourth wall 2a and the seventh wall 2c, respectively to reinforce the corresponding outer webs.

The bumper beam 71 shown in FIG. 9 includes a beam body 22 and a reinforcing plate 63. The reinforcing plate 63 is attached to the beam body 22 so that its surface is closely fitted to both the B1-side surfaces of two overhang parts 2f in the beam body 22, and also so that the inner surfaces of the two projection parts 63a are closely fitted to the upper surface of the fourth wall 2a and the bottom surface of the seventh wall 2c respectively.

The bumper beam 81 shown in FIG. 10 is composed of a beam body 32 and a reinforcing plate 63.

The bumper beam 91 shown in FIG. 11 has a beam body 92 and a reinforcing plate 63. The beam body 92 is the same as the beam body 22 except for the shapes of the fourth wall 2a and the seventh wall 2c. Concretely, the fourth wall 2a and the seventh wall 2c of the beam body 92 are free from the overhang parts 2f, and parallel to the longitudinal direction B in the whole area extending from the B2-side end to the B1-side end. In the bumper beam 91 shown in FIG. 11, the above-mentioned reinforcing plate 33, reinforcing plate 43 or reinforcing plate 53 may be disposed instead of the reinforcing plate 63.

In each of the bumper beams shown in FIGS. 8 to 11, if the Young's modulus of the beam body is $E_{st}$, the density of the beam body is $\rho_{st}$, the Young's modulus of the reinforcing plate is $E_2$ and the density of the reinforcing plate is $\rho_2$, $E_{st}$, $E_2$, $\rho_{st}$ and $\rho_2$ satisfy the condition shown in the above-mentioned expression (1).

Sixth Embodiment

Figure 12A:
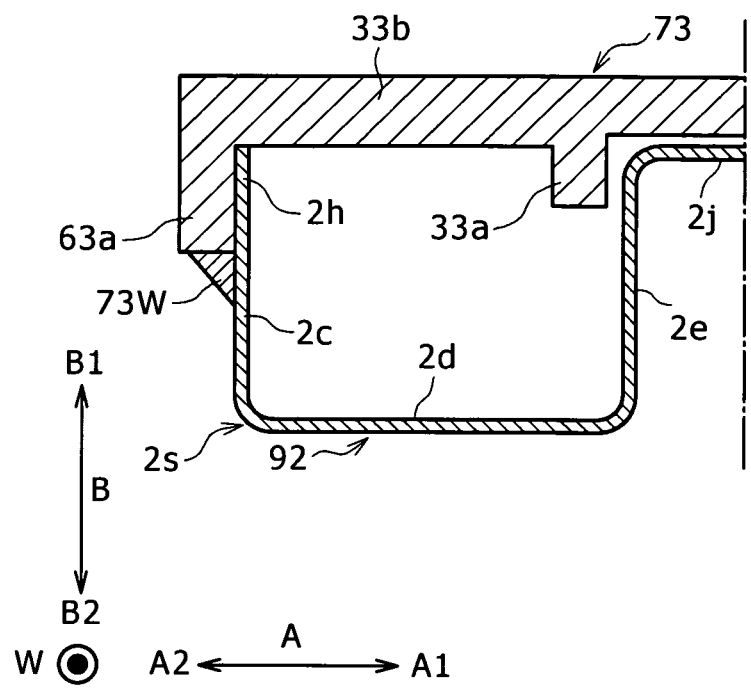
FIG. 12($a$) is a cross sectional view of a bumper beam according to a sixth embodiment of the present invention, and ($b$) is a cross sectional view of a bumper beam according to a first modification example thereof.

A bumper beam in a sixth embodiment of the present invention will be described in reference to FIGS. 12(a) and (b). With respect to the same part as in the above-mentioned embodiments, the same reference number is assigned in the drawing to omit the description therefor. FIG. 12(a) is a cross sectional view of the bumper beam according to the sixth embodiment, and (b) is a cross sectional view of a bumper beam according to a first modification example thereof. In this embodiment, only the left side from the center line of the drawing (the dashed line) is shown in FIGS. 12(a) and (b) without the description for the right side, since the bumper beam is symmetric relative to the lateral direction in FIGS. 12(a) and (b). The points different from the above-mentioned embodiments are mainly described below without the description for the same items as in the above-mentioned embodiments.

(Structure of Bumper Beam)

The bumper beam of this embodiment includes, as shown in FIG. 12(a), a beam body 92 and an aluminum-made reinforcing plate (first reinforcing plate) 73. An end part 2h on the B1 side of the seventh wall 2c is parallel to the longitudinal direction B. In the seventh wall 2c, the overhang part 2f shown in FIG. 2 or the overhang part 2g shown in FIG. 4 may be formed instead of the end part 2h.

The reinforcing plate 73 (corresponding to the above-mentioned reinforcing plate 33) is formed by extrusion molding, and has a collision surface. The reinforcing plate 73 functions as an alternate member of the eighth wall 2b.

The reinforcing plate 73 has a body part 33b, and two projection parts 33a and two projection parts 63a projecting from the inside surface (a surface opposite to the collision surface) of the body part 33b. Both the projection parts 33a are located at angle parts formed by the body part 33b and two inner webs (the second wall 2k and the fifth wall 2e) respectively to reinforce the corresponding inner webs. Both the projection parts 63a are located at angle parts formed by the body part 33b and two outer webs (the fourth wall 2a and the seventh wall 2c) respectively to reinforce the corresponding outer webs.

Figure 12B:
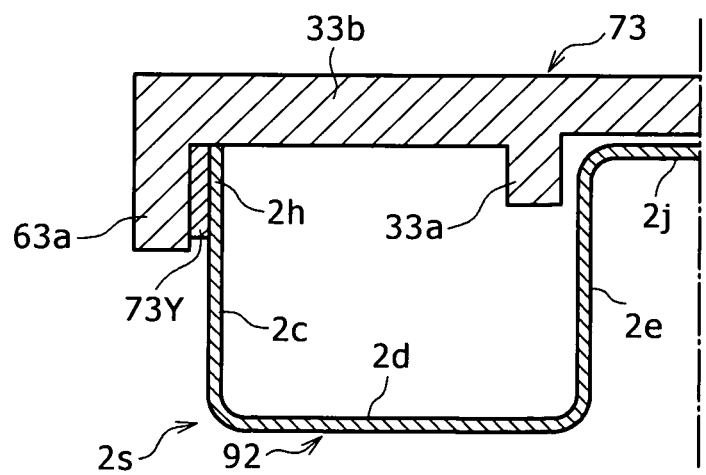

The respective tips (end parts 2h) of the fourth wall 2a and the seventh wall 2c are integrated to the two projection parts 63a respectively by welding to form a weld bead part 73W as shown in FIG. 12(a). However, the method for integrating the reinforcing plate 73 to the beam body 92 is not limited to welding and, for example, the tips of the fourth wall 2a and the seventh wall 7c may be integrated to the two projection parts 63a respectively by adhesion (through an adhesive 73Y interposed between the both) as shown in FIG. 12(b).

Effect of Bumper Beam According to this Embodiment

The bumper beam of this embodiment has the following effects by holding the fourth wall 2a and the seventh wall 2c from both the sides by the two projection parts (second projection parts) 63a projecting from the body part 33b of the reinforcing plate 73 in a direction orthogonal thereto, and fixing the two projection parts to the tips of the fourth wall 2a and the seventh wall 2c.

(a) Outwardly swelling buckling (buckling in which the middle portion of the fourth wall 2a and the middle portion of the seventh wall 2c are deformed to separate from each other) is suppressed. The reason is that (i) the deformation of the fourth wall 2a and the seventh wall 2c is suppressed by their contact with the two projection parts 63a, and (ii) the buckling load of the fourth wall 2a and the seventh wall 2c is enhanced by the integration of the fourth wall 2a and the seventh wall 2c to the two projection parts 63a.

(b) Inwardly contracting buckling (buckling in which the middle portion of the fourth wall 2a and the middle portion of the seventh wall 2c are deformed to approach each other) is suppressed. The reason is that the buckling load of the fourth wall 2a and the seventh wall 2c is enhanced by the integration of the fourth wall 2a and the seventh wall 2c to the two projection parts 63a.

The projecting direction of each projection part 63a has only to be a direction intersecting the reinforcing plate 73 in one cross section perpendicular to the reference line W and, for example, may be inclined relative to the normal to the reinforcing plate 73.

Modification Example

Figure 13A:
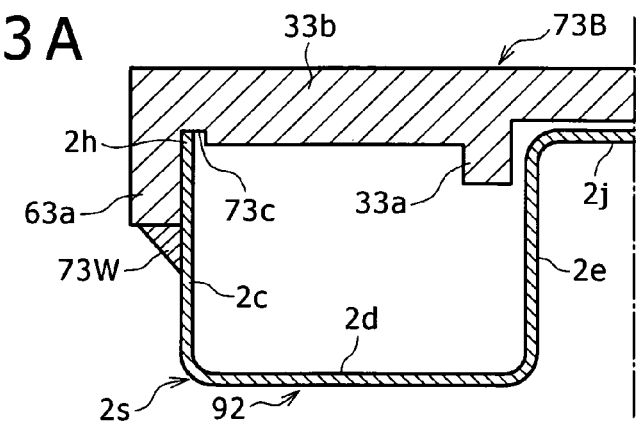
FIG. 13($a$) is a cross sectional view of a bumper beam according to a second modification example of the sixth embodiment, ($b$) is a cross sectional view of a bumper beam according to a third modification example thereof, and ($c$) is a cross sectional view of a bumper beam according to a fourth modification example thereof.
Figure 13B:
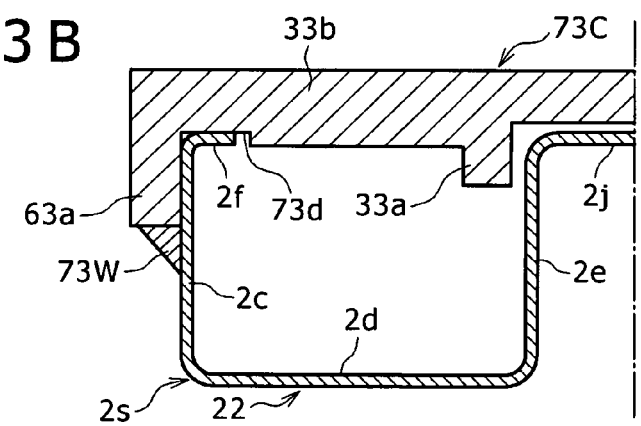
Figure 13C:
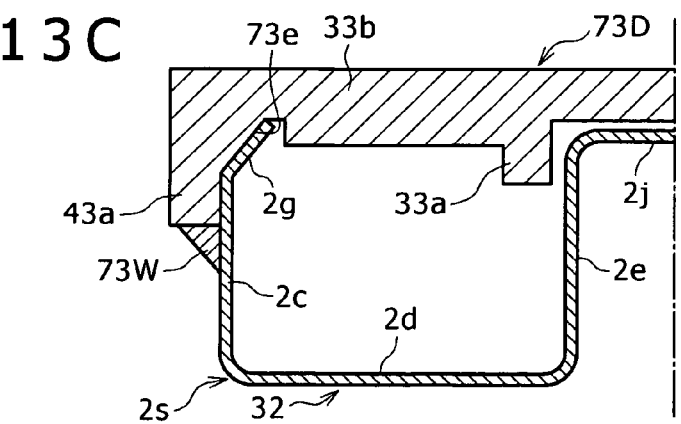
Figure 14:
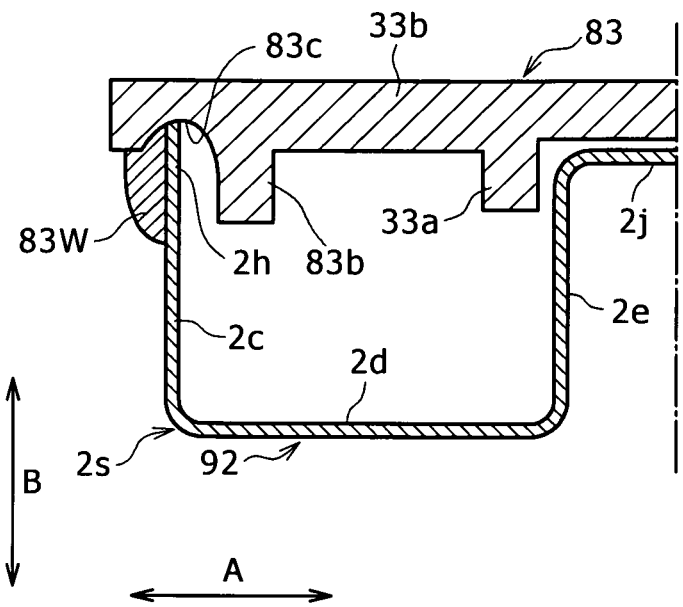
FIG. 14 is a cross sectional view of a bumper beam according to a fifth modification example of the sixth embodiment.

The bumper beam of the sixth embodiment may have structures shown in FIGS. 13 and 14 as modification examples without being limited to the above-mentioned structure. These modification examples will be then described. With respect to the same part as in the above-mentioned embodiments, the same reference number is assigned in the drawing to omit the description therefor. FIG. 13(a) is a cross sectional view of a bumper beam according to a second modification example, FIG. 13(b) is a cross sectional view of a bumper beam according to a third modification example, FIG. 13(c) is a cross sectional view of a bumper beam according to a fourth modification example, and FIG. 14 is a cross sectional view of a bumper beam according to a fifth modification example.

The points different from the above-mentioned sixth embodiment are mainly described below without the description for the same items as in the sixth embodiment. Since the bumper beam according to each modification example has a symmetric shape relative to the lateral direction in FIGS. 13 and 14, only the left side from the center line of the drawing (dashed line) is shown in FIGS. 13 and 14 without the description for the right side.

The bumper beam of FIG. 13(a) includes a reinforcing plate 73B formed of aluminum-based material (corresponding to the reinforcing plate 73), and a beam body 92. In the reinforcing plate 73B, a recessed part 73c is formed inside the root part of each projection part 63a. The recessed parts 73c for housing the tips of the fourth wall 2a and the seventh wall 2c (the tips of the end parts 2h) respectively are disposed within an area sandwiched between the two projection parts 63a, and dented to the B1 side beyond the B2-side surface of the body part 33b.

The bumper beam of FIG. 13(b) includes a reinforcing plate 73C formed of aluminum-based material (corresponding to the reinforcing plate 73), and a beam body 22. In the reinforcing plate 73C, a recessed part 73d is formed inside the root part of each projection part 63a. The recessed parts 73d for housing the tips of the fourth wall 2a and the seventh wall 2c (the tips of the overhang parts 2f) respectively are disposed within an area sandwiched between the two projection parts 63a, and dented to the B1 side beyond the B2-side surface of the body part 33b.

The bumper beam of FIG. 13(c) includes a reinforcing plate 73D formed of aluminum-based material (corresponding to the reinforcing plate 73), and a beam body 32. The reinforcing plate 73D has a body part 33b including a collision surface, and two projection parts 33a and two projection part 43a projecting from the inside surface (a surface opposite to the collision surface) of the body part 33b including a collision surface. A recessed part 73e is formed inside the root part of each projection part 43a. The recessed parts 73e for housing the tips of the fourth wall 2a and the seventh wall 2c which are outer wall parts of each swelling part 2t, 2s (the tips of the overhang parts 2g) respectively are disposed within an area sandwiched between the two projection parts 43a, and dented to the B1 side beyond the B2-side surface of the body part 33b.

(Effect of Bumper Beam of Each Modification Example)

The effects of the above-mentioned modification examples will be described typically with respect to the bumper beam of FIG. 13(a). In this bumper beam, the recessed parts 73c formed respectively inside the root parts of the two projection parts 63a of the reinforcing plate 73B house the tips of the fourth wall 2a and the seventh wall 2c respectively, whereby the peeling of the projection parts 63a from the fourth wall 2a and the seventh wall 2c (disassembling by peeling in an integrated part of the both or the weld bead part 73W) is suppressed to maintain the integrated state of the reinforcing plate 73B to the beam body 92 at least until the beam body 92 is buckling-deformed. Thus, inward buckling of the fourth wall 2a and the seventh wall 2c (buckling in which the middle portion of the fourth wall 2a and the middle portion of the seventh wall 2c are deformed to approach each other) is suppressed.

The bumper beam of FIG. 14 includes a reinforcing plate 83 formed of aluminum-based material (corresponding to the above-mentioned reinforcing plate 73), and a beam body 92. The reinforcing plate 83 has a body part 33b having a collision surface, and two projection parts 33a and two projection parts (third projection parts) 83b projecting from the inside surface (a surface opposite to the collision surface) of the body part 33b along the longitudinal direction B.

Recessed parts 83c are formed respectively outside the root parts of the two projection parts 83b. The recessed parts 83c for housing the tips of the fourth wall 2a and the seventh wall 2c respectively to restrict the movement of the end parts 2h to the A1 side and to A2 side are formed in positions where the two projection parts 83b are held thereby from both the outer sides in the vertical direction A, and dented to the B1 side beyond the B2-side surface of the body part 33b. The recessed parts 83c are located at angle parts formed by the body part 33b and two outer webs (the fourth wall 2a and the seventh wall 2c) respectively to reinforce the corresponding outer webs from the inside.

The tips of the fourth wall 2a and the seventh wall 2c (the end parts 2h) are integrated to the reinforcing plate 83 by welding to form a weld bead part 83W shown in FIG. 14. A part of the weld bead part 83W is located within the recessed part 83c. Each of the two projection parts 83b suppresses the inward buckling of the corresponding outer web by abutting the projection parts 83b on the outer web from the inside.

If the Young's modulus of each beam body in FIGS. 13 and 14 is $E_{st}$, the density of the beam body is $\rho_{st}$, the Young's modulus of the reinforcing plate is $E_2$ and the density of the reinforcing plate is $\rho_2$, the Young's moduli $E_{st}$, $E_2$, the densities $\rho_{st}$ and $\rho_2$ satisfy the condition shown in the above-mentioned expression (1).

(Effect of This Structure)

The effect of the modification example of FIG. 14 will be described. In the bumper beam of FIG. 14, two projection parts (third projection parts) 83b projecting in a direction intersecting the body part 33b are formed in positions sandwiched between the fourth wall 2a and the seventh wall 2c (the outer wall parts of the swelling parts 2t and 2s) in the reinforcing plate 83, and these projection parts 83b suppress the buckling of the fourth wall 2a and the seventh wall 7c (buckling in which the middle portion of the fourth wall 2a and the middle portion of the seventh wall 2c are deformed to approach each other), whereby the bending strength of the bumper beam is further improved.

Since the projection parts 83b are fixed and integrated to the tips of the fourth wall 2a and the seventh wall 2c (the end parts 2h) respectively, the outwardly swelling buckling and the inwardly swelling buckling of the fourth wall 2a and the seventh wall 2c are suppressed.

The recessed parts 83c formed respectively outside the root parts of the projection parts 83b of the reinforcing plate 83 house the tips of the fourth wall 2a and the seventh wall 2c respectively, whereby the peeling (disassembling) of the integrated part (the weld bead part 83W) is suppressed to maintain the integrated state of the reinforcing plate 83 to the beam body 92 at least until the beam body 92 is buckling-deformed. Thus, the inward buckling of the beam body (buckling in which the middle portion of the fourth wall 2a and the middle portion of the seventh wall 2c are deformed to approach each other) is suppressed.

The projecting direction of each projection part 83b has only to be a direction intersecting the reinforcing plate 83 in one cross section perpendicular to the reference line W, and may be inclined relative to the normal to the reinforcing plate 83.

Seventh Embodiment

Figure 15:
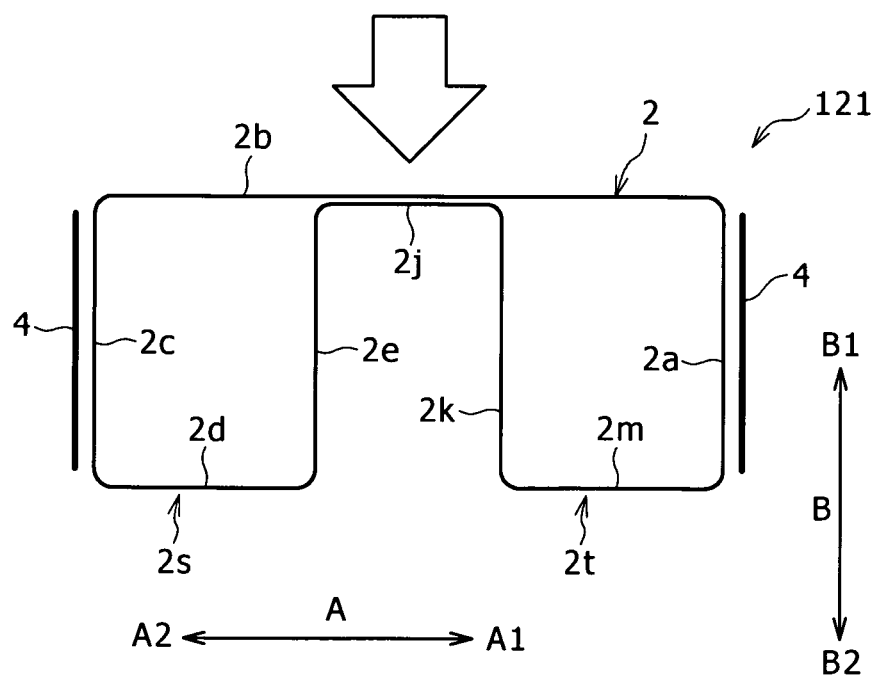
FIG. 15 is a cross sectional view of a bumper beam according to a seventh embodiment of the present invention.

A bumper beam 121 according to a seventh embodiment of the present invention will be then described in reference to FIG. 15. With respect to the same part as in the above-mentioned embodiments, the same reference number is assigned in the drawing to omit the description therefor. FIG. 15 is a cross sectional view of the bumper beam 121 according to the seventh embodiment. The points different from the above-mentioned embodiments are mainly described below without the description for the same items as in the above-mentioned embodiment.

(Structure of Bumper Beam 121)

The bumper beam 121 includes, as shown in FIG. 15, a beam body 2, and two reinforcing plates (second reinforcing plates) 4, and has a B-shaped cross section.

Each reinforcing plate 4 is produced by extrusion-molding an aluminum-based material, and is attached to each outside surface of the fourth wall 2a and the seventh wall 2c. Concretely, each reinforcing plate 4 is disposed in parallel to the fourth wall 2a and the seventh wall 7c, and also in parallel to the longitudinal direction B. The reinforcing plates 4 are integrated to the beam body 2 by welding, with the surfaces of the reinforcing plates 4 being closely fitted to the surfaces of the fourth wall 2a and the seventh wall 2c respectively. Both the reinforcing plates 4 are disposed to hold the fourth wall 2a and the seventh wall 2c from both the outer side in the vertical direction A. Concretely, one reinforcing plate 4 is fixed to the lower surface of the seventh wall 2c, and the other reinforcing plate 4 to the upper surface of the fourth wall 2a.

Both the reinforcing plates 4 are attached to all over the whole outer surfaces of two outer webs, or the fourth wall 2a and the seventh wall 2c, respectively to reinforce the corresponding outer webs. Namely, both the reinforcing plates 4 function as reinforcing materials of the fourth wall 2a and the seventh wall 2c respectively. The thickness of each reinforcing plate 4 in this embodiment is 2.0 mm, and the aluminum-based material constituting the reinforcing plate 4 has a Young's modulus of 6,900 MPa and a density of 2700 kg/m³.

(Young's Modulus and Density)

The relation between Young's modulus and density in the seventh embodiment will be described. If the Young's modulus of the beam body 2 is $E_{st}$, the density of the beam body 2 is $\rho_{st}$, the Young's modulus of the reinforcing plate 4 is $E_3$, and the density of the reinforcing plate 4 is $\rho_3$, $E_{st}$, $E_3$, $\rho_{st}$ and $\rho_3$ satisfy a condition shown in the following expression (6).

$$E_{st}/\rho_{st}^3 < E_3/\rho_3^3 \quad (6)$$

The thickness $t_3$ of the reinforcing plate 4 is set so as to satisfy a condition shown in the following expression (7), wherein $t_{st}$ is the thickness of the beam body 2.

$$t_3 < (\rho_{st}/\rho_3) \times t_{st} \quad (7)$$

Further, the thickness $t_3$ of the reinforcing plate 4 is set so as to satisfy a condition shown in the following expression (8) so that the reinforcing plate 4 can exhibit a sufficient reinforcing effect.

$$0.3 \times t_{st} < t_3 \quad (8)$$

The effectiveness that each material satisfies the conditions shown in the above-mentioned expressions (6) to (8) will be described. If the buckling length of the reinforcing plate 4 is L, the thickness of the reinforcing plate 4 is t, and the Young's modulus of the reinforcing plate 4 is E, the buckling load $P_{cr}$ of the reinforcing plate 4 can be represented by the following expression (9).

$$P_{cr} \propto (E \cdot t^3)/L^2 \quad (9)$$

Assuming that L is constant, the expression (9) can be represented by the following expression (10).

$$P_{cr} \propto E \cdot t^3 \quad (10)$$

According to the expression (10), if the Young's modulus of the beam body 2 is $E_{st}$, the thickness of the beam body 2 is $t_{st}$, the Young's modulus of the reinforcing plate 4 is $E_3$, and the thickness of the reinforcing plate 4 is $t_3$, effective reinforcement of the beam body 2 can be attained by satisfying a condition shown in the following expression (11).

$$E_{st} \cdot t_{st}^3 < E_3 \cdot t_3^3 \quad (11)$$

On the other hand, the relation between weight W and density $\rho$ of a certain material is represented by the following expression (12).

$$W \propto \rho \cdot t \quad (12)$$

Thus, the relation of the following expression (13) is established by providing the reinforcing plate 4 so that the weight of a "portion subjected to attachment (to be described later)" of the beam body 2 is equal to the weight of the reinforcing plate 4.

$$\rho_{st} \cdot t_{st} = \rho_3 \cdot t_3 \quad (13)$$

The area of the portion subjected to attachment is equal to the area of the reinforcing plate. The "portion subjected to attachment" corresponds to the fourth wall 2a and the seventh wall 2c of this embodiment. When the reinforcing plate 4 is attached to the second wall 2k (or the fifth wall 2e) as described later, the second wall 2k (or the fifth wall 2e) corresponds to the "portion subjected to attachment".

The above-mentioned relation of the expression (6) is derived from the above-mentioned expressions (13) and (11). Thus, reinforcement of the beam body 2 with a material such that it satisfies the expression (6) enables efficient improvement in buckling load per weight ($P_{cr}/W$).

Further concretely, for example, when the reinforcing plate 4 having substantially the same weight as the fourth wall 2a is attached to the beam body 2, the weight of the fourth wall 2a and the reinforcing plate 4 is about twice the weight of the fourth wall 2a, while the buckling load of the fourth wall 2a and the reinforcing plate 3 becomes larger than twice the buckling load of the fourth wall 2a. The same can be said in a case in which the reinforcing plate 4 is attached to the seventh wall 2c.

In this embodiment, the expression (6) is satisfied with $E_{st}/\rho_{st}^3 = 4.30 \times 10^{\wedge}(-8)$ [MPa·m/kg$^3$] and $E_3/\rho_3^3 = 3.51 \times 10^{\wedge}(-7)$ [MPa·m/kg$^3$], wherein $E_{st} = 21,000$ MPa, $E_3 = 6,900$ MPa, $\rho_{st} = 7,874$ kg/m$^3$, and $\rho_3 = 2,700$ kg/m$^3$.

In this embodiment, the expression (7) is also satisfied with $(\rho_{st}/\rho_3) \times t_{st} = 4.08$ mm $> t_3$ ($=2.0$ mm), wherein $t_{st} = 1.4$ mm, and $t_3 = 2.0$ mm. Further, the expression (8) is also satisfied with $0.3 \times t_{st} = 0.42$ mm $< t_3$ ($=2.0$ mm).

The bumper beam according to this embodiment does not have to always satisfy the expression (13).

(Simulation Result of Buckling Load)

Figure 16:
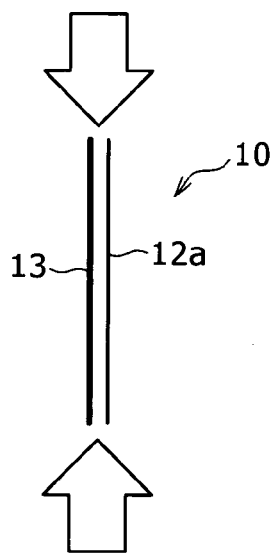
FIG. 16 is a cross sectional view of a sample for evaluation of buckling load.

Results of evaluation for buckling load will be then described. The buckling load was calculated using a sample 10 shown in FIG. 16. The sample 10 is composed of a steel plate 12a and an aluminum plate (plate of aluminum-based material) 13, the steel plate 12a being reinforced by the aluminum plate 13. The aluminum plate 13 and the steel plate 12a are disposed in parallel to each other, and fixed so that the respective surfaces are closely fitted to each other.

The buckling load of the sample 10 was calculated in a condition where mutually reversed forces along a direction parallel to the aluminum plate 13 and the steel plate 12a (refer to the directions of arrows in the drawing) are worked on the upper end and lower end of the sample 10. The steel plate 12a corresponds to the seventh wall 2c of FIG. 15, and the aluminum plate 13 corresponds to the reinforcing plate 4 in FIG. 15. Thus, the buckling load of the seventh wall 2c (and the fourth wall 2a) of the bumper beam 121 can be known by calculating the buckling load of the sample 10.

The steel plate 12a is of 980 MPa-class, and the aluminum plate 13 is composed of 7000 series aluminum alloy. The thickness of the steel plate 12a, the thickness of the aluminum plate 13, the weight ratio, the plate thickness ratio and the buckling load ratio are shown in Table 3.

TABLE 3

| Thickness of Steel Plate (mm) | Thickness of Aluminum Plate (mm) | Weight Ratio | Thickness Ratio | Buckling Load Ratio |
|---|---|---|---|---|
| 1.4 | — | 1.00 | — | 1.00 |
| 1.6 | — | 1.14 | — | 1.49 |
| 2.0 | — | 1.43 | — | 2.92 |
| 2.5 | — | 1.79 | — | 5.69 |
| 1.4 | 0.4 | 1.10 | 0.29 | 1.44 |
| 1.4 | 1.0 | 1.25 | 0.71 | 2.82 |
| 1.4 | 2.0 | 1.49 | 1.43 | 7.68 |
| 1.4 | 3.0 | 1.74 | 2.14 | 16.63 |

Figure 17:
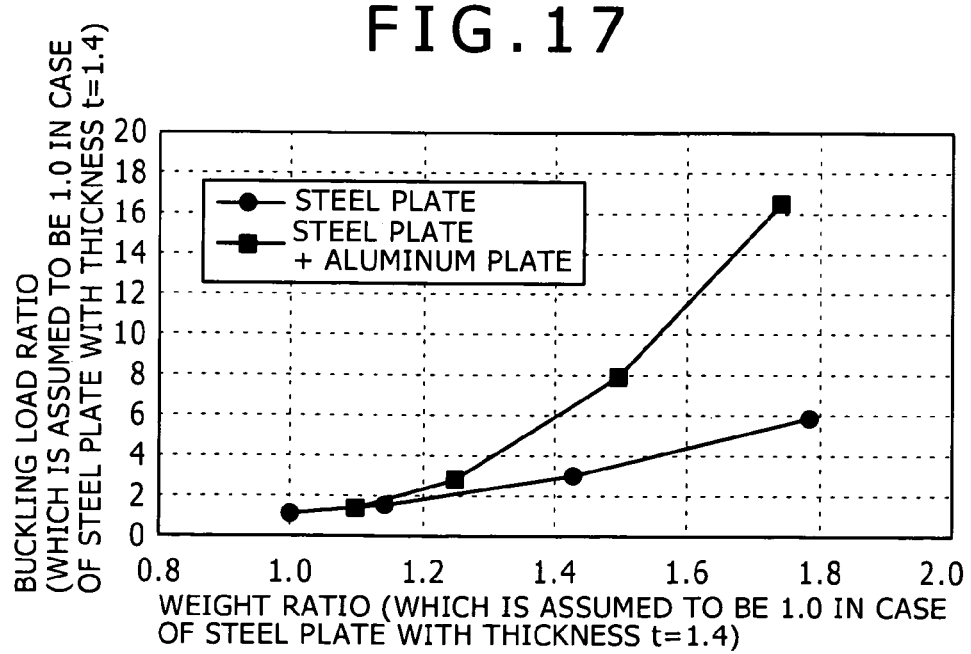
FIG. 17 is a graph showing a test result for the sample.

FIG. 17 shows the results of Table 3 as a graph. In the graph of FIG. 17, the horizontal axis shows a weight ratio based on the weight of 1.4-mm-thick steel product (without reinforcement) (1.0), and the vertical axis shows a buckling load ratio based on the buckling load in 1.4-mm-thick steel product (without reinforcement). The "steel plate" in the graph of FIG. 17 shows the steel plate 12a which is not reinforced with the aluminum plate 13, and the "steel plate+aluminum plate" shows the sample 10.

(1) The 2.5-mm-thick steel plate 12a which is not reinforced with the aluminum plate 13 has a weight ratio of 1.79 and a buckling load ratio of 5.69, while (2) the 1.4-mm-thick steel plate which is reinforced with the 3.0-mm-thick aluminum plate 13 has a weight ratio of 1.74, which is substantially equal to the weight ratio of the steel plate of (1), and a buckling load ratio of 16.63, which is about three times the buckling load ratio of the steel plate of (1).

As is apparent from the examples of (1) and (2), Table 3 and the graph of FIG. 17, the buckling load can be increased more efficiently by reinforcing the steel plate 12a with the aluminum plate 13 than by increasing the thickness of the steel plate 12a.

Eighth Embodiment

Figure 18:
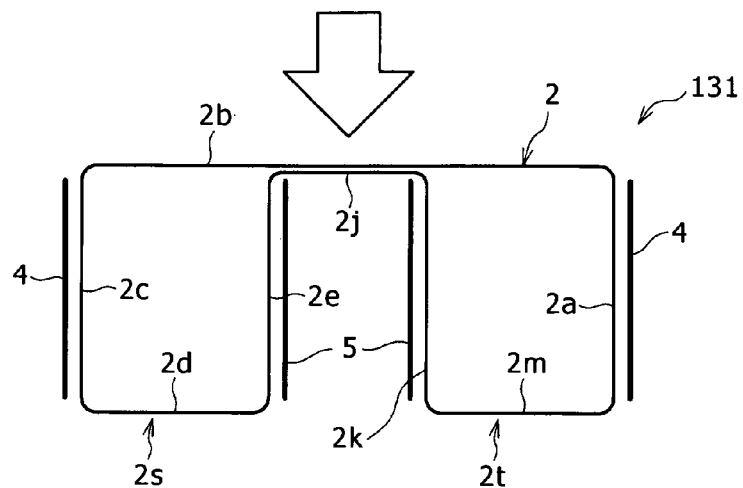
FIG. 18 is a cross sectional view of a bumper beam according to an eighth embodiment of the present invention.

A bumper beam 131 according to an eighth embodiment of the present invention will be then described in reference to FIG. 18. With respect to the same part as in the above-mentioned embodiments, the same reference number is assigned in the drawing to omit the description therefor. FIG. 18 is a cross sectional view of the bumper beam 131 according to the eighth embodiment. The points different from the above-mentioned embodiments are mainly described below without the description for the same items as in the above-mentioned embodiment.

The bumper beam 131 of this embodiment is obtained by adding further two reinforcing plates (second reinforcing plates) 5 to the bumper beam 121 shown in FIG. 15. Each reinforcing plate 5 is the same member as the above-mentioned reinforcing plate 4, and used to reinforce each of two inner webs (the second wall 2k and the fifth wall 2e). Concretely, two reinforcing plates 5 are attached to the second wall 2k and the fifth wall 2e in an attitude parallel thereto, and disposed in parallel to the longitudinal direction B. Both the reinforcing plates 5 are integrated to the beam body 2 by welding so that the surfaces of both the reinforcing plates 5 are closely fitted respectively to the surface of the second wall 2k and the fifth wall 2e. Both the reinforcing plates 5 are held by the second wall 2k and the fifth wall 2e from both the outer sides in the vertical direction A. One reinforcing plate 5 is fixed to the upper surface of the fifth wall 2e, and the other reinforcing plate 5 to the lower surface of the fifth wall 2e.

The two reinforcing plates 5 are attached to all over the whole outer surfaces of inner webs, or the second wall 2k and the fifth wall 2e, respectively, to reinforce respective inner webs.

(Simulation Result of Bending Strength)

Results of evaluation for bending strength in bumper beam will be then described. With respect to four types of bumper beams (the bumper beam 121 shown in FIG. 15, the bumper beam 131 shown in FIG. 18, and two types of bumper beams differed in thickness of steel plate without the reinforcing plate 4 (not shown)), calculation of bending strength was performed. Concretely, the bending strength was calculated in a condition in which the center (the center related to the vertical direction A) of each bumper beam is pressurized backwardly from the front side along the longitudinal direction B (refer to the arrows in FIGS. 15 and 18). The thickness of the beam body (steel plate) 2, and the presence/absence of reinforcing material (plate of aluminum-based material), the weight ratio, and the maximum bending moment ratio are shown in Table 4.

TABLE 4

| Thickness of Steel Plate (mm) | Presence/Absence of Reinforcing Material | Weight Ratio | Maximum Bending Moment Ratio |
|---|---|---|---|
| 1.4 | Non | 1.00 | 1.00 |
| 2.0 | Non | 1.41 | 1.75 |

TABLE 4-continued

| Thickness of Steel Plate (mm) | Presence/Absence of Reinforcing Material | Weight Ratio | Maximum Bending Moment Ratio |
|---|---|---|---|
| 1.4 | 2 points | 1.10 | 1.24 |
| 1.4 | 4 points | 1.19 | 1.67 |

Figure 19:
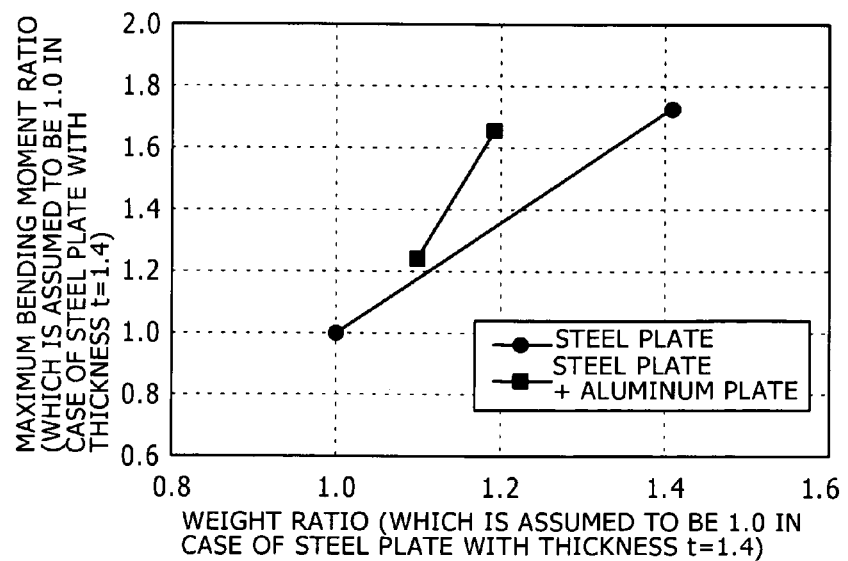
FIG. 19 is a graph showing an evaluation result of bending strength in bumper beam.

FIG. 19 shows the results of Table 4 as a graph. In this graph, the horizontal axis shows a weight ratio based on the weight of 1.4 mm-thick steel product (without reinforcement) (1.0), and the vertical axis shows a maximum bending moment ratio based on the maximum bending moment in 1.4 mm-thick steel product (without reinforcement). The "steel plate" in the graph of FIG. 19 shows a steel plate which is not reinforced with a plate of aluminum-based material, and the "steel plate+aluminum plate" shows the bumper beam 121 and the bumper beam 131.

It is found from the graph of FIG. 19 that the bending strength is increased when the number of reinforcing points of the bumper beam is increased from two (the bumper beam 121; weight ratio 1.10) to four (the bumper beam 131; weight ratio 1.19).

The maximum bending moment ratio of the bumper beam 131 is 1.67, in contrast to the maximum bending moment ratio of 1.75 of the bumper beam composed of only the beam body 2 formed of 2.0-mm-thick steel plate. Thus, the maximum bending moment ratio of the bumper beam 131 is comparable to that of the beam body 2 formed of 2.0-mm-thick steel plate. On the other hand, the weight ratio of the bumper beam 131 is kept as low as 1.19 (weight increasing rate: 20%), compared with the weight ratio of 1.41 of the beam body 2 formed of 2.0-mm-thick steel plate (weight increasing rate: 40%).

As described so far, the outer webs and inner webs of the beam body 2 formed of steel are effectively reinforced by fixing reinforcing plates formed of aluminum to the whole surfaces thereof. The Young's moduli and densities of the beam body and the reinforcing plate satisfy the condition shown in the expression (6), whereby the bending strength can be improved while minimizing the increase in weight.

Modification Example

Figure 20A:
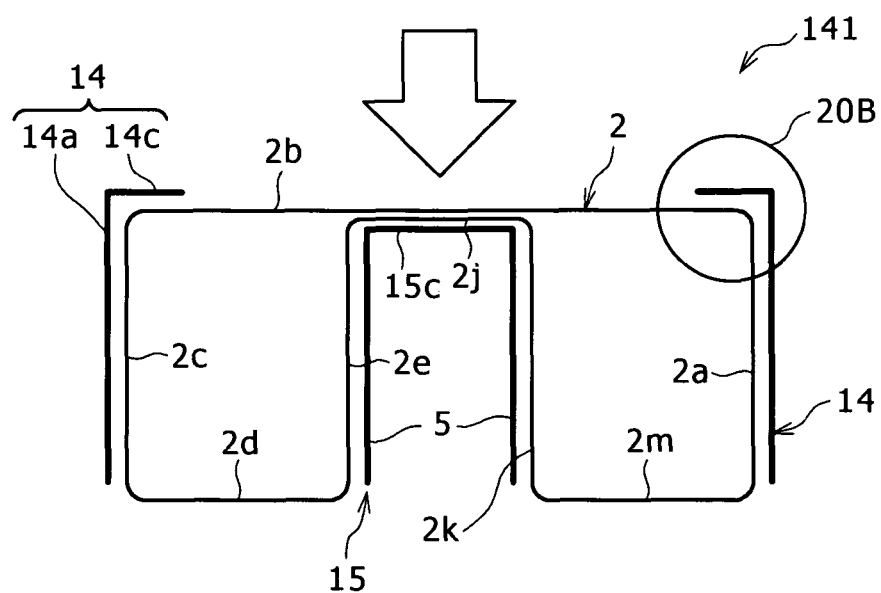
FIG. 20($a$) is a cross sectional view of a bumper beam according to a first modification example of the eighth embodiment, and ($b$) is an enlarged view of a part surrounded by a circle 20B in ($a$)

The bumper beam according to the eighth embodiment is never limited to the above-mentioned structure. Modification examples thereof are shown in FIGS. 20 and 21. With respect to the same part as in the above-mentioned embodiments, the same reference number is assigned in the drawing to omit the description therefor. FIG. 20(a) is a cross sectional view of a bumper beam 141 according to a first modification example of the eighth embodiment, and (b) is an enlarged view of a part surrounded by a circle 20B shown in (a). FIG. 21 is a cross sectional view of a bumper beam 151 according to a second modification example of the eighth embodiment. The parts differed from the above-mentioned eighth embodiment are mainly described below without the description for the same item as the above-mentioned eighth embodiment.

The bumper beam 141 shown in FIG. 20(a) has a beam body 2, two reinforcing plates (second reinforcing plates) 14, and a reinforcing plate composite body 15. The two reinforcing plates 14 and the reinforcing plate composite body 15 are formed of plate materials (plates of aluminum-based material) bent at proper positions.

Each reinforcing plate 14 (corresponding to the above-mentioned reinforcing plate 4) has an L shape in an optional cross section orthogonal to the reference line W. Concretely, as shown also in FIG. 20(b), the reinforcing plate 14 includes a reinforcing plate body 14a, and an overhang wall 14c overhanging from one end part of the reinforcing plate body 14a in a direction orthogonal to the reinforcing plate body 14a (a direction along the vertical direction A in this embodiment).

Figure 20B:
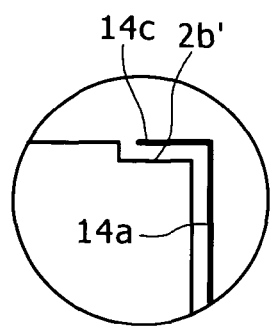
Figure 21:
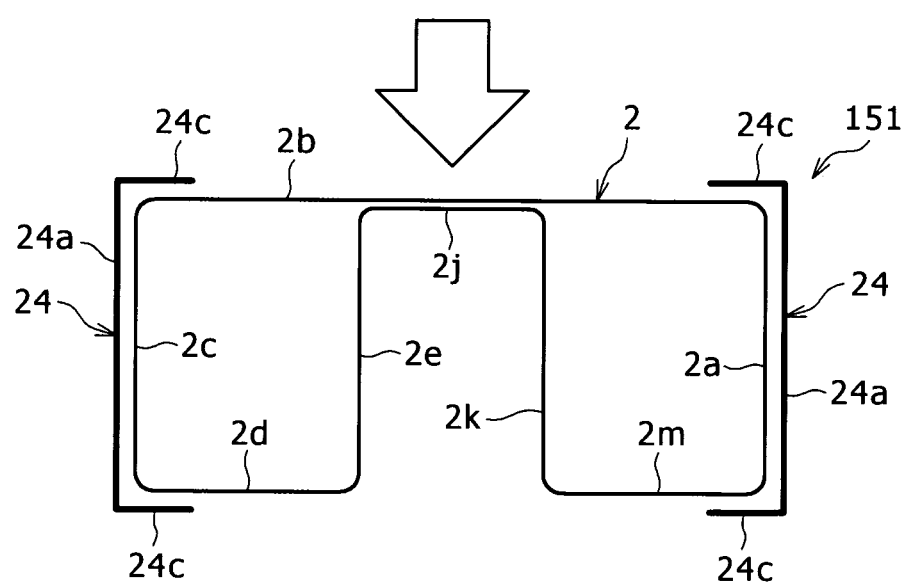
FIG. 21 is a cross sectional view of a bumper beam according to a second modification example of the eighth embodiment.

On the other hand, dents 2b' shown in FIG. 20(b) are formed at both end parts (upper and lower end parts) of the front surface of the beam body 2. As shown in the enlarged view, each of the dents 2b' is dented backward beyond the front surface of the other part of the beam body 2.

Of the reinforcing plate 14, the reinforcing plate body 14a is fixed to the whole outer surface of the outer web, and the overhang wall 14c is fixed to the eighth wall 2b while being fitted to the dent 2b' of the eighth wall 2b. This fitting of the overhang wall 14c to the dent 2b' allows to continue the front surface of the overhang wall 14c to the front surface of the eighth wall 2b on the same plane while matching the front surface position of the overhang wall 14c to the front surface position of the eighth wall 2b.

The above-mentioned reinforcing plate composite body 15, which is attached to a middle part of the beam body 2, includes two reinforcing plates 5 and a center wall 15c connecting one-side ends of the reinforcing plates to each other. The center wall 15c is fixed to the first wall 2j so as to extend in parallel to the vertical direction A, and to be closely fitted to the whole surface of the first wall 2j. Both the reinforcing plates 5 are fixed respectively to the surfaces of the second wall 2k and the fifth wall 2c so as to be closely fitted to the whole surfaces thereof.

As the metallic materials constituting the reinforcing plate 14 and the reinforcing plate composite body 15, any material which satisfies the condition shown in the above-mentioned expression (6) can be adopted without particular limitation.

In the structure shown in FIGS. 20(a) and (b), the beam body 2 can be effectively reinforced with a small number of reinforcing plates. Further, since the positioning of the reinforcing plates 14 and the reinforcing plate composite body 15 to the beam body 2 is facilitated, the efficiency in manufacturing of the bumper beam is improved.

The bumper beam 151 shown in FIG. 21 includes a beam body 2 and two reinforcing plates 24. Each reinforcing plate 24 is composed of a plate of aluminum-based material bent at proper positions, and includes a reinforcing plate body 24a and overhang walls 24c formed respectively at both ends thereof. The reinforcing plate body 24a of each reinforcing plate 24 is fixed to the outer surface of the corresponding outer web, while each overhang wall 24c is fixed to a part of the front surface of the eighth wall 2b or a part of the rear surface of the third wall 2m (or the sixth wall 2d) so as to be closely fitted thereto.

Similarly to the above-mentioned bumper beam 141, the same dents as the dents 2b' may be formed respectively at both ends of the eighth wall 2b. Further, dents dented along the longitudinal direction B may be formed also at end parts (end parts relative to the vertical direction A) of the third wall 2m and the sixth wall 2d. A total of four overhang walls 24c are fitted respectively to these four dents, whereby the front surface positions of two overhang walls 14c on the front side can be matched to the front surface position of the eighth wall 2b, and the rear surface positions of two overhang walls 14c on the rear side can be matched to the rear surface positions of the third wall 2m and the sixth wall 2d.

Summary of Seventh Embodiment and Eighth Embodiment

The summary of the bumper beams according to the seventh embodiment and the eighth embodiment will be then described. As a typical structure, the bumper beam 121 shown in FIG. 15 is described below. The bumper beam 121, which is configured to be mounted on the front of a vehicle body and to extend along a reference line W, includes a beam body 2 formed of steel plate and extending along the reference line W and two reinforcing plates (second reinforcing plates) 4 formed of aluminum-based material, extending along the reference line W, and attached to the beam body 2.

The beam body 2 has, in an optional cross section perpendicular to the reference line W, (a) an eighth wall (reference wall) 2b extending linearly, and (b) an upper swelling part 2t and a lower swelling part 2s each swelling in a direction intersecting the eighth wall 2b while enclosing an internal space, and these constitute a B-shaped cross section. In this cross section, the upper swelling part 2t has a fourth wall 2a as an outer wall part and a second wall 2k as an inner wall part, and the lower swelling part 2s has a fifth wall 2e as an inner wall part and a seventh wall 2c as an outer wall part. These four wall parts extend in a direction intersecting the eighth wall 2b (a direction orthogonal thereto in the drawing) and are aligned along the eighth wall 2b.

The reinforcing plates 4 are attached to the fourth wall 2a and the seventh wall 2c as the outer wall parts respectively in an attitude parallel thereto. Further, the reinforcing plate 4 and the beam body 2 satisfy the following condition.

$$(E_{st}/\rho_{st}^3) < (E_3/\rho_3^3)$$

$E_{st}$: Young's modulus of the beam body
$\rho_{st}$: Density of the beam body
$E_3$: Young's modulus of the second reinforcing plate
$\rho_3$: Density of the second reinforcing plate The two reinforcing plates 4 each formed of a plate of aluminum-based material (aluminum or aluminum alloy) efficiently reinforce the beam body 2 by being disposed respectively on two outer webs (the fourth wall 2a and the seventh wall 2c) of the beam body. Further, the Young's moduli and densities of the reinforcing plate 4 and the beam body 2 satisfy the above-mentioned condition, whereby the bending strength of the bumper beam can be improved while minimizing the increase in weight of the bumper beam.

Further, the above-mentioned bumper beam 121 satisfies the following condition.

$$t_3 < (\rho_{st}/\rho_3) \times t_{st}$$

$t_3$: Thickness of the reinforcing plate 4
$t_{st}$: Thickness of the beam body 2

This enables to suppress the increase in weight of the attachment object part of each reinforcing plate 4 by addition of the reinforcing plate 4 to less than twice the weight of the wall part to which the reinforcing plate 4 is attached (the fourth wall 2a or the seventh wall 2c). For example, the weight of the attachment object part in attachment of the reinforcing plate 4 to the fourth wall 2a (the weight of the reinforcing plate 4 and the fourth wall 2a) is below twice the weight of the fourth wall 2a.

The bumper beam 121 further satisfies the following condition.

$$0.3 \times t_{st} < t_3$$

The reinforcing plate 4 which satisfies this condition can surely improve the bending strength of the bumper beam.

In other words, the bending strength of the bumper beam 121 can be improved while minimizing the increase in weight of the bumper beam 121 by manufacturing the bumper beam so as to satisfy each of the above-mentioned conditions. This manufacturing method includes an attachment step of attaching the reinforcing plate 4 to the beam body 2.

Modification Example of Each Embodiment

The above-mentioned embodiments are only concrete examples and never particularly limit the present invention. The concrete structure of the present invention can be changed in design. The functions and effects described in the embodiments are only the most preferable functions and effects resulting from the above-mentioned embodiments, and the functions and effects by the present invention are never limited to those described in the above-mentioned embodiments.

For example, each of the above-mentioned projection parts 33a, 43a, 63a, 83a, and 83b does not have to be always formed integrally with the body part of the reinforcing plate. These projection parts may be formed of members separate from the plate constituting the body part of the reinforcing plate, and fixed to the plate by welding or the like.

The reinforcing plate does not have to be bonded to all over the whole surface of each web. For example, the surface of the reinforcing plate may be bonded to part of the surface of the web when the surface area of the reinforcing plate is smaller than the surface area of the web, or part of the surface of the reinforcing plate may be bonded to part of the surface of the web.

The method of attaching the reinforcing plate to each web is never limited to the method of joining the surfaces of the both to each other. For example, the reinforcing plate may be embedded in the web surface.

The collision direction with a collision object does not have to be matched to the longitudinal direction, and may be inclined relative to the longitudinal direction. Namely, the collision direction does not have to be orthogonal to the first reinforcing plate or the eighth wall 2b.

The second reinforcing plate may be attached to not the outside of the beam body but the inside thereof. For example, the reinforcing plates 4 shown in FIG. 15 may be attached to not the outside surfaces of the fourth wall 2a and the seventh wall 2c but the inside surfaces (the left surface of the fourth wall 2a and the right surface of the seventh wall 2c in FIG. 15).

The bumper beam according to the present invention may be configured to be mounted not only on the front of the vehicle body as in each of the above-mentioned embodiments, but also on the rear of the vehicle body.

Although the cross section orthogonal to the reference line W in the bumper beam according to each of the above-mentioned embodiments is uniform with respect to the longitudinal direction of the bumper beam, the bumper beam according to the present invention is never limited to a one having a uniform cross section, and has only to satisfy, with respect to at least one cross section orthogonal to the reference line W, the conditions for the shapes of the beam body and the reinforcing plate described so far.

As described so far, the present invention provides a bumper beam which can be improved in bending strength with minimum increase in weight.

(1) A bumper beam according to the first aspect of the present invention, which is configured to be mounted on the front or rear of a vehicle body and to extend along a reference line, includes a beam body formed of a metallic plate and extending along the reference line, and a metallic first reinforcing plate extending along the reference line and attached to the beam body. In at least one cross section perpendicular to the reference line, the first reinforcing plate extends linearly, and the beam body includes a pair of swelling parts each swelling from the first reinforcing plate in a direction intersecting it while enclosing an internal space.

Further, the beam body and the first reinforcing plate satisfy the following condition:

$$(E_{st}/\rho_{st}^3) < (E_2/\rho_2^3)$$

$E_{st}$: Young's modulus of the beam body
$\rho_{st}$: Density of the beam body
$E_2$: Young's modulus of the first reinforcing plate
$\rho_2$: Density of the first reinforcing plate This bumper beam is preferably mounted on the vehicle body so that the first reinforcing plate is located outside the beam body (on the front side of the beam body in the case of a front bumper, and on the rear side of the beam body in the case of a rear bumper). According to this, the first reinforcing plate can reinforce the beam body. Further, the Young's moduli and densities of the beam body and the first reinforcing plate satisfy the above-mentioned condition, whereby the bending strength of the bumper beam can be improved while minimizing the increase in weight of the bumper beam.

The materials for the beam body and the first reinforcing plate may be the same or different. Examples of a preferable combination of materials of "beam body-first reinforcing plate" include "steel-aluminum", "steel-steel", "steel-copper", and "copper-copper".

The formation of a sectional shape as described above, or, the formation that the first reinforcing plate linearly extends, and the beam body includes a pair of swelling parts each swelling from the first reinforcing plate in a direction intersecting it, and each swelling part encloses an internal space with the first reinforcing plate, has only to be established with respect to at least one of cross sections perpendicular to the reference line, and the above-mentioned sectional shape does not have to be always present on all the cross sections of the bumper beam.

The extending direction of the bumper beam (the direction of the reference line) may be paralleled to the width direction of the vehicle body or may be inclined relative to the width direction. The reference line may be straight line or curved line (for example, lines having arch-like shape or other curved shapes). The angle of the above-mentioned "intersecting" is not limited to right angle, and may be smaller than right angle.

(2) Concretely, the bumper beam of (1) may be such that, with respect to at least one cross section perpendicular to the reference line, each of the swelling parts has an outer wall part extending in a direction intersecting the first reinforcing plate and an inner wall part extending in a direction intersecting the first reinforcing plate at a position closer to the other swelling part than the position of the outer wall part, both the outer wall parts and both the inner wall parts being aligned along the first reinforcing plate. Four wall parts composed of the inner wall parts and the outer wall parts may be paralleled or may be inclined relative to the longitudinal direction of the vehicle body. The intersecting angle of the wall parts with the first reinforcing plate may be equal to or smaller than right angle.

(3) In the bumper beam of (2), the first reinforcing plate preferably includes first projection parts projecting from the first reinforcing plate in a direction intersecting the longitudinal direction of the first reinforcing plate to hold both the inner wall parts from the outside. The first projection parts suppress the buckling of each inner wall part (buckling in which the middle portions of the inner wall parts are deformed outwardly or to separate from each other), whereby the bending strength of the bumper beam is further improved.

(4) In the bumper beam of (2), the first reinforcing plate preferably includes also second projection parts projecting from the first reinforcing plate in a direction intersecting the longitudinal direction of the first reinforcing plate to hold both the outer wall parts from the outside. The second projection parts suppress the buckling of each outer wall part (buckling in which the middle portions of the outer wall parts are deformed outwardly or to separate from each other), whereby the bending strength of the bumper beam is further improved.

(5) In the bumper beam of (4), it is further preferred to fix each outer wall part to the corresponding second projection part. This allows further effective suppression of both the inward and outward buckling of each outer wall part. Concretely, the suppression of the outwardly swelling buckling of each outer wall part (buckling in which the middle portion of the outer wall part are deformed outwardly or to separate from each other) can be attained by (i) suppressing the deformation of the outer wall part by contact of each second projection part with the corresponding outer wall part and by (ii) enhancing the buckling load by the integration of each outer wall part to the corresponding second projection part. The suppression of the inwardly denting buckling of each outer wall (buckling in which the middle portion of the outer wall part deforms inwardly or to approach each other) can be attained by enhancing the buckling load by the integration of each outer wall part to the corresponding second projection part.

The means for fixing each outer wall part to the corresponding second projection part includes adhesion, welding, and bolting.

(6) Further, in the bumper beam of (5), it is further preferred to form, in a position inside a root part of each second projection part of the first reinforcing plate, a recessed part for housing a tip of the corresponding outer wall part. By housing the tip of the outer wall part in the recessed part, the peeling of the outer wall part from the second projection part in the joint part between the both is suppressed to maintain the integrated state of the first reinforcing plate and the beam body at least until the beam body is buckling-deformed. Consequently, the inward buckling of each outer wall part (buckling in which the middle portion of each outer wall part is deformed to approach each other) is suppressed.

(7) In the bumper beam of (2), it is also preferred to provide, on the first reinforcing plate, third projections projecting from the first reinforcing plate in a direction intersecting its longitudinal direction to constrain both the outer wall parts from the inside, and to fix the corresponding outer wall part to each third projection part. The third projection parts suppress the inward buckling of each outer wall surface (buckling in which the middle portions of the outer wall parts are deformed inwardly or to approach each other), whereby the bending strength of the bumper beam is further improved. Further, the integration of each outer wall part to the first reinforcing plate also suppresses the outwardly swelling buckling and inwardly contracting buckling of the outer wall part.

(8) With respect to the third projection parts, also, it is further preferred to form a recessed part for housing the tip of the corresponding outer wall part in a position outside the root part of each third projection part of the first reinforcing plate. By housing the tips of the outer wall parts in the recessed parts, the peeling of the outer wall part from the third projection part at the joint part thereof is suppressed to maintain the integrated state of the first reinforcing plate and the beam body at least until the beam body is buckling-deformed. Thus, the inward buckling of each outer wall part (buckling in which the middle portion of each outer wall part deforms to approach each other) is suppressed.

The means for fixing each outer wall part to the corresponding third projection part includes adhesion, welding, and bolting.

(9) In the bumper beam according to the present invention, as the material of the first reinforcing plate, for example, aluminum or aluminum alloy (duralumin, etc.) is preferred. A lightweight first reinforcing plate can be obtained by using such material. The use of aluminum alloy enhances the strength of the first reinforcing plate, compared with the use of pure aluminum.

(10) The bumper beam according to the second aspect of the present invention, which is configured to be mounted on the front or rear of a vehicle body and to extend along a reference line, includes a beam body formed of a metallic plate and extending along the reference line, and a metallic second reinforcing plate extending along the reference line and attached to the beam body. In at least one cross section perpendicular to the reference line, the beam body includes a reference wall extending linearly and a pair of swelling parts each swelling from the reference wall in a direction intersecting it while enclosing an internal space, each of the swelling parts has an outer wall part extending in a direction intersecting the reference wall, and an inner wall part extending in a direction intersecting the first reinforcing plate at a position closer to the other swelling part than the position of the outer wall part, and the outer wall parts and the inner wall parts are aligned along the reference wall. The second reinforcing plate is attached to at least either both the outer wall parts or both the inner wall parts in an attitude parallel thereto.

Further, the beam body and the second reinforcing plate satisfy the following condition.

$$(E_{st}/\rho_{st}^3) < (E_2/\rho_2^3)$$

$E_{st}$: Young's modulus of the beam body
$\rho_{st}$: Density of the beam body
$E_3$: Young's modulus of the second reinforcing plate
$\rho_3$: Density of the second reinforcing plate In this bumper beam, the second reinforcing plate formed of metallic material is attached to at least one wall part, whereby the beam body can be reinforced. The Young's moduli and densities of the beam body and the reinforcing plate satisfy the above-mentioned condition, whereby the bending strength of the bumper beam can be improved while minimizing the increase in weight of the bumper beam.

The materials of the beam body and the reinforcing plate may be the same or different. Examples of a preferable combination of the materials of "beam body-second reinforcing plate" includes "steel-aluminum", "steel-steel", "steel-copper", and "copper-copper".

The formation of a sectional shape as described above, or the formation that the beam body includes a reference wall extending linearly and a pair of swelling part each swelling from the reference wall in a direction intersecting it while enclosing an internal space, each swelling part has an inner wall part and an outer wall part extending in a direction intersecting the reference wall, each inner wall part and each outer wall part being aligned along the reference wall, and the second reinforcing plate is attached to at least either both the inner wall parts or both the outer wall parts in an attitude parallel thereto, has only to be established with respect to at least one of cross sections perpendicular to the reference line, and the above-mentioned sectional shape does not have to be always present in all the cross sections of the bumper beam.

The extending direction of the bumper beam (the direction of the reference line) may be paralleled to the width direction of the vehicle body or may be inclined relative to the width direction. The reference line may be straight line or curved line (for example, lines having arch-like shape or other curved shapes). The angle of "intersecting" described above is never limited to right angle, and may be smaller than right angle.

Each of the wall parts may be paralleled or inclined relative to the longitudinal direction. The intersecting angle of these wall parts to the reference wall is never limited to right angle.

The number of the second reinforcing plates may be one or two or more. For example, a total of two second reinforcing plates may be attached to both the outer wall parts respectively, or a total of four second reinforcing plates may be attached to both the outer wall parts and both the inner wall parts respectively.

An overhang wall overhanging in a direction orthogonal to the other part of the second reinforcing plate may be formed at the front end or rear end of the second reinforcing plate. The second reinforcing plate may be attached to the outer surface of the beam body or the inner surface thereof.

The means for connecting and integrating the beam body to the second reinforcing plate includes welding, screw fastening, and adhesion and the like.

(11) The bumper beam of (10) further preferably satisfies the following condition.

$$t_3 < (\rho_{st}/\rho_3) \times t_{st}$$

$t_{st}$: Thickness of the beam body
$t_3$: Thickness of the second reinforcing plate In a bumper beam which satisfies this condition, the total sum of the weight of the second reinforcing plate and the weight of a wall part to which the second reinforcing plate is attached can be suppressed to below twice the weight of the wall part alone. Namely, the weight of the wall part to which the second reinforcing plate is attached, including the second reinforcing plate, is below twice the weight of the wall part.

(12) The bumper beam of (10) further preferably satisfies the following condition.

$$0.3 \times t_{st} < t_3$$

The bumper beam satisfies the above-mentioned condition, whereby the bending strength of the bumper beam is surely improved.

(13) In the bumper beam of (10), also, as the material of the second reinforcing plate, for example, aluminum or aluminum alloy (duralumin, etc.) is suitably used. A lightweight first reinforcing plate can be obtained by using such material. The use of aluminum alloy enhances the strength of the first reinforcing plate, compared with the use of pure aluminum.

(14) The bumper beam for solving the above-mentioned problem, which is configured to be mounted on the front or rear of a vehicle body and to extend along a reference line, may be such that it includes a metallic beam body extending along the reference line, and having a first wall, a second wall, a third wall, a fourth wall, a fifth wall, a sixth wall, and a seventh wall; and a metallic first reinforcing plate extending along the reference line, and satisfies the following conditions A and B.

A. In at least one cross section perpendicular to the reference line, the following conditions (a) to (g) are satisfied.

(a) The second wall extends from one end of the first wall in a direction intersecting the first wall.

(b) The third wall extends from an end part opposite to the first wall of the second wall in a direction intersecting the second wall toward the opposite side to the first wall relative to the second wall.

(c) The fourth wall extends from an end part opposite to the second wall of the third wall in a direction intersecting the third wall toward the second wall relative to the third wall.

(d) The fifth wall extends from the other end part of the first wall in a direction intersecting the first wall toward the same side as the second wall relative to the first wall.

(e) The sixth wall extends from an end part opposite to the first wall of the fifth wall in a direction intersecting the fifth wall toward the opposite side to the first wall relative to the fifth wall.

(f) The seventh wall extends from an end part opposite to the fifth wall of the sixth wall in a direction intersecting the sixth wall toward the fifth wall relative to the sixth wall.

(g) The reinforcing plate extends in the extending direction of the first wall, and is attached to the end part opposite to the third wall and the sixth wall of the beam body relative to the direction perpendicular to the first wall.

B. The beam body and the reinforcing plate satisfy the following condition.

$$(E_{st}/\rho_{st}^3) < (E_2/\rho_2^3)$$

$E_{st}$: Young's modulus of the beam body
$\rho_{st}$: Density of the beam body
$E_2$: Young's modulus of the reinforcing plate
$\rho_2$: Density of the reinforcing plate In this bumper beam, the second wall, the fourth wall, the fifth wall, and the seventh wall may be paralleled or inclined relative to the longitudinal direction. The first wall, the third wall and the sixth wall may be paralleled or inclined relative to the vertical direction. Each of the first to the seventh walls may extend linearly or extend in a curved shape in at least one cross section perpendicular to the reference line. With respect to each "intersecting" described above, the intersecting angle is never limited to right angle.

The beam body may include an eighth wall (a wall part connecting an end part opposite to the third wall of the fourth wall to an end part opposite to the sixth wall of the seventh wall and extending in the extending direction of the first wall), or does not have to include it.

When the beam body is free from the eighth wall, overhang parts extending in a direction orthogonal to the fourth wall and the seventh wall may be formed at the end parts of the fourth wall and the seventh wall (an end part opposite to the third wall of the fourth wall and an end part opposite to the sixth wall of the seventh wall) respectively. When the beam body has the eighth wall, the eighth wall may be paralleled or inclined relative to the vertical direction. In at least one cross section perpendicular to the reference line, the eighth wall may extend linearly or extend in a curved shape.

When the eighth wall is not provided on the beam body, the reinforcing plate may be attached to the fourth wall and the seventh wall, or may be attached to the surface of the first wall. When the eighth wall is provided on the beam body, the reinforcing plate may be attached to the surface of the eighth wall. The means for connecting and integrating the beam body and the reinforcing plate includes welding, screw fastening, adhesion and the like.

(15) The bumper beam for solving the above-mentioned problem, which is configured to be mounted on the front or rear of a vehicle body and to extend along a reference line, can be such that it includes a metallic beam body extending along the reference line and having a first wall, a second wall, a third wall, a fourth wall, a fifth wall, a sixth wall, a seventh wall and an eighth wall; and a metallic second reinforcing plate extending along the reference line, and satisfies the following conditions C and D.

C. In at least one cross section perpendicular to the reference line, the following conditions (a) to (g) are satisfied.

(a) The second wall extends from one end of the first wall in a direction intersecting the first wall.

(b) The third wall extends from an end part opposite to the first wall of the second wall in a direction intersecting the second wall toward the opposite side to the first wall relative to the second wall.

(c) The fourth wall extends from an end part opposite to the second wall of the third wall in a direction intersecting the third wall toward the second wall relative to the third wall.

(d) The fifth wall extends from the other end part of the first wall in a direction intersecting the first wall toward the same side as the second wall relative to the first wall.

(e) The sixth wall extends from an end part opposite to the first wall of the fifth wall in a direction intersecting the fifth wall toward the opposite side to the first wall relative to the fifth wall.

(f) The seventh wall extends from an end part opposite to the fifth wall of the sixth wall in a direction intersecting the sixth wall toward the fifth wall relative to the sixth wall.

(g) The eighth wall extends in the extending direction of the first wall while connecting an end part opposite to the third wall of the fourth wall to an end part opposite to the sixth wall of the seventh wall, and the second reinforcing plate is attached to at least one of the second wall, the fourth wall, the fifth wall and the seventh wall in parallel thereto.

D. The beam body and the second reinforcing plate satisfy the following condition.

$$(E_{st}/\rho_{st}^3)<(E_3/\rho_3^3)$$

$E_{st}$: Young's modulus of the beam body
$\rho_{st}$: Density of the beam body
$E_3$: Young's modulus of the second reinforcing plate
$\rho_3$: Density of the second reinforcing plate The second wall, the fourth wall, the fifth wall and the seventh wall may be paralleled or inclined relative to the longitudinal direction. The first wall, the third wall, the sixth wall and the eighth wall may be paralleled or inclined relative to the vertical direction. Each of the first to the eighth walls may extend linearly or extend in a curved shape in at least one cross section perpendicular to the reference line. With respect to each "intersecting" described above, the intersecting angle is not limited to right angle.

The number of the second reinforcing plates may be one or two or more. For example, a total of two second reinforcing plates may be attached to the fourth wall and the seventh wall respectively, or a total of four second reinforcing plates may be attached to the second wall, the fourth wall, the fifth wall and the seventh wall respectively.

For example, the second reinforcing plates attached to the second wall and the fifth wall respectively may be connected to each other by a connecting plate (a plate extending in the extending direction of the first wall). An overhang wall extending perpendicular to the other part of the second reinforcing plate may be formed at the front end or rear end of the second reinforcing plate. The second reinforcing plate may be attached to the outer surface of the beam body, or may be attached to the inner surface thereof.

The invention claimed is:

1. A bumper beam, which is configured to be mounted on the front or rear of a vehicle body and to extend along a reference line, comprising:
a beam body formed of a metallic plate and extending along the reference line; and
a metallic first reinforcing plate extending along the reference line and attached to said beam body, wherein
in at least one cross section perpendicular to the reference line, said first reinforcing plate extends linearly, and said beam body includes a pair of swelled parts, each swelled part being formed to extend from said first reinforcing plate in an intersecting direction while enclosing an internal space, and wherein
said beam body and said first reinforcing plate satisfy the following condition:

$$(E_{st}/\rho_{st}^3)<(E_2/\rho_2^3) \text{ wherein}$$

$E_{st}$: Young's modulus of said beam body
$\rho_{st}$: Density of said beam body
$E_2$: Young's modulus of said first reinforcing plate
$\rho_2$: Density of said first reinforcing plate.

2. The bumper beam according to claim 1, wherein, in at least one cross section perpendicular to the reference line, each swelled part has an outer wall part extending in a direction intersecting said first reinforcing plate, and an inner wall part extending in a direction intersecting said first reinforcing plate at a position closer to the other swelled part than a position of the corresponding outer wall part, and both said outer wall parts and both said inner wall parts of the pair of swelled parts are aligned along said first reinforcing plate.

3. The bumper beam according to claim 2, wherein said first reinforcing plate includes first projection parts projecting from said first reinforcing plate in a direction intersecting the longitudinal direction of said first reinforcing plate to hold both said inner wall parts from the outside.

4. The bumper beam according to claim 2, wherein said first reinforcing plate includes second projection parts projecting from said first reinforcing plate in a direction intersecting the longitudinal direction of said first reinforcing plate to hold both said outer wall parts from the outside.

5. The bumper beam according to claim 4, wherein each of said outer wall parts is fixed to said corresponding second projection part.

6. The bumper beam according to claim 5, wherein, in a position inside a root part of each second projection part of said first reinforcing plate, a recessed part for housing a tip of said corresponding outer wall part is formed.

7. The bumper beam according to claim 2, wherein said first reinforcing plate includes third projection parts projecting from said first reinforcing plate in a direction intersecting the longitudinal direction of said first reinforcing plate to constrain both said outer wall parts from the inside, and said corresponding outer wall part is fixed to each of said third projection parts.

8. The bumper beam according to claim 7, wherein in a position outside said root part of each third projection part of said first reinforcing plate, a recessed part for housing the tip of said corresponding outer wall part is formed.

9. The bumper beam according to claim 1, wherein the material of said first reinforcing plate is aluminum or aluminum alloy.

10. A bumper beam, which is configured to be mounted on the front or rear of a vehicle body and to extend along a reference line, comprising:
a beam body formed of a metallic plate, and extending along the reference line;
a metallic first reinforcing plate extending along the reference line and attached to said beam body; and
a metallic second reinforcing plate extending along the reference line, and attached to said beam body, wherein
in at least one cross section perpendicular to the reference line, said beam body includes a reference wall extending linearly; and a pair of swelled parts, each swelled part being formed to extend from the reference wall in an intersecting direction while enclosing an internal space, each of said swelled parts having an outer wall part extending in a direction intersecting the reference wall and an inner wall part extending in a direction intersecting said first reinforcing plate at a position closer to the other swelled part than the position of said outer wall part, each outer wall part and each inner wall part being aligned along the reference line, and wherein said second reinforcing plate is attached to at least either both said outer wall parts or both said inner wall parts in parallel thereto, and wherein said beam body and said second reinforcing plate satisfy the following condition:

$$(E_{st}/\rho_{st}^3) < (E_2/\rho_2^3) \text{ wherein}$$

$E_{st}$: Young's modulus of said beam body
$\rho_{st}$: Density of said beam body
$E_2$: Young's modulus of said first reinforcing plate
$\rho_2$: Density of said first reinforcing plate.

11. The bumper beam according to claim 10, wherein the bumper beam further satisfies the following condition:

$$t_3 < (.\rho_{st}/\rho_3) \times t_{st} \text{ wherein}$$

$t_3$: Thickness of said second reinforcing plate
$t_{st}$: Thickness of said beam body.

12. The bumper beam according to claim 10, wherein the bumper beam further satisfies the following condition:

$$0.3 \times t_{st} < t_3 \text{ wherein}$$

$t_3$: Thickness of said second reinforcing plate
$t_{st}$: Thickness of said beam body.

13. The bumper beam according to claim 10, wherein the material of said second reinforcing material is aluminum or aluminum alloy.

* * * * *